US010180892B2

(12) United States Patent
Fujimura et al.

(10) Patent No.: US 10,180,892 B2
(45) Date of Patent: Jan. 15, 2019

(54) EVALUATION SYSTEM, NON-TRANSITORY STORAGE MEDIUM STORING THEREON EVALUATION PROGRAM, AND EVALUATION METHOD

(71) Applicant: OMRON CORPORATION, Kyoto-shi, Kyoto (JP)

(72) Inventors: Ryosuke Fujimura, Kusatsu (JP); Nobuyuki Takuma, Kusatsu (JP); Hiromu Suganuma, Ritto (JP); Asahi Matsui, Takatsuki (JP); Masaya Inoue, Yokohama (JP)

(73) Assignee: OMRON CORPORATION, Kyoto-shi, Kyoto (JP)

( * ) Notice: Subject to any disclaimer, the term of this patent is extended or adjusted under 35 U.S.C. 154(b) by 73 days.

(21) Appl. No.: 15/417,443

(22) Filed: Jan. 27, 2017

(65) Prior Publication Data
US 2017/0262357 A1    Sep. 14, 2017

(30) Foreign Application Priority Data

Mar. 14, 2016 (JP) ................................. 2016-049933

(51) Int. Cl.
*G06F 11/36* (2006.01)
*G05B 19/042* (2006.01)
(Continued)

(52) U.S. Cl.
CPC ........ *G06F 11/3612* (2013.01); *G05B 19/048* (2013.01); *G05B 19/0428* (2013.01); *G06F 11/277* (2013.01); *G06F 11/3692* (2013.01)

(58) Field of Classification Search
None
See application file for complete search history.

(56) References Cited

U.S. PATENT DOCUMENTS 5,182,755 A * 1/1993 Sekiguchi ............. F02D 41/266
                                                700/81
6,879,891 B1 * 4/2005 Bederna .................. F02D 41/22
                                                477/78
(Continued)

FOREIGN PATENT DOCUMENTS

EP    0610711 A1    8/1994
JP    S64-003748 A    1/1989
(Continued)

OTHER PUBLICATIONS

Communication dated Jul. 19, 2017, from European Patent Office in counterpart application No. 17153126.2.
(Continued)

*Primary Examiner* — Isaac T Tecklu
(74) *Attorney, Agent, or Firm* — Sughrue Mion, PLLC

(57) ABSTRACT

An evaluation system includes a process execution module that executes an operation in accordance with a safety program, a setting module that receives an evaluation condition, a first determination module that changes the value of the input signal to be evaluated, from a first input value which is an initial value to a second input value, and determines whether a first output value of the output signal to be evaluated which is determined by the process execution module is identical to the expected output value, a second determination module that restores the value of the input signal to be evaluated, from the second input value to the first input value, and determines whether a second output value of the output signal to be evaluated which is determined by the process execution module is identical to the first output value, and an output module that outputs a determination result.

20 Claims, 17 Drawing Sheets

(51) Int. Cl.
*G05B 19/048* (2006.01)
*G06F 11/277* (2006.01)

(56) References Cited

U.S. PATENT DOCUMENTS

| | | | | |
|---|---|---|---|---|
| 8,539,448 B2 * | 9/2013 | Neupartl | ............ | G05B 19/056 717/124 |
| 2004/0218317 A1 * | 11/2004 | Kawazu | ............ | G05B 19/058 361/1 |
| 2005/0060606 A1 * | 3/2005 | Kalan | ............ | G05B 9/03 714/12 |
| 2005/0091410 A1 * | 4/2005 | Gibart | ............ | G05B 9/03 709/248 |
| 2006/0259837 A1 | 11/2006 | Teranishi et al. | | |
| 2007/0006197 A1 * | 1/2007 | Murphy | ............ | G06F 8/43 717/151 |
| 2007/0006314 A1 * | 1/2007 | Costa | ............ | G06F 21/554 726/25 |
| 2009/0254312 A1 * | 10/2009 | Kube | ............ | G05B 23/0256 702/186 |
| 2012/0036493 A1 * | 2/2012 | Moosmann | ............ | G05B 9/03 717/105 |
| 2014/0351323 A1 * | 11/2014 | Sumida | ............ | G06Q 50/10 709/203 |
| 2016/0055079 A1 * | 2/2016 | Hanna | ............ | G06F 11/3692 717/135 |
| 2016/0062335 A1 * | 3/2016 | Hoshino | ............ | G05B 19/0428 700/108 |
| 2016/0291566 A1 * | 10/2016 | Prosak | ............ | G06F 8/654 |
| 2016/0327923 A1 * | 11/2016 | Papenbreer | ............ | G05B 19/048 |
| 2017/0123396 A1 * | 5/2017 | Papenbreer | ............ | G05B 19/048 |
| 2017/0147427 A1 * | 5/2017 | Nero | ............ | G06F 11/0796 |
| 2017/0261970 A1 * | 9/2017 | Fujimura | ............ | G05B 23/0218 |
| 2017/0262357 A1 * | 9/2017 | Fujimura | ............ | G06F 11/3612 |

FOREIGN PATENT DOCUMENTS

| | | |
|---|---|---|
| JP | 2006-277624 A | 10/2006 |
| JP | 2006-325390 A | 11/2006 |
| JP | 2014-137621 A | 7/2014 |
| WO | 2009/105889 A1 | 9/2009 |

OTHER PUBLICATIONS

Communication dated Sep. 5, 2018, issued by the Japanese Patent Office in counterpart Japanese Application No. 2016-049933.

* cited by examiner

FIG.9

| | | | | | |
|---|---|---|---|---|---|
| Simple/Automatic/Test Settings × | | | | | |
| Run | Test Result | Register Variables | Feedback Settings | Export | Import |

▼ Test Condition
Reset Signal  SystemReset

▼ Input Settings

| No. | Variable | Comment | Reset Type | Input Type |
|---|---|---|---|---|
| 1 | ZoneA_EmergencyStop | EMERGENCY STOP | Manual | |
| 2 | ZoneB_EmergencyStop | EMERGENCY STOP | Manual | |
| 3 | ZoneA_LightCurtain01 | LIGHT CURTAIN | Manual | |
| 4 | ZoneB_LightCurtain01 | LIGHT CURTAIN | Manual | |
| 5 | ZoneA_LaserScanner01 | LASER SCANNER | Auto | |
| 6 | ZoneB_LaserScanner01 | LASER SCANNER | | |
| 7 | ZoneC_SafetyLimitSwitch01 | LIMIT SWITCH | Manual | 2 Inputs |
| | ZoneC_SafetyLimitSwitch02 | LIMIT SWITCH | Manual | 2 Inputs |

▼ Output Settings

| No. | Variable | Comment |
|---|---|---|
| 1 | ServoA01_Contactor | CONTACTOR |
| 2 | ServoA02_Contactor | CONTACTOR |
| 3 | ServoB01_Contactor | CONTACTOR |
| 4 | ServoB02_Contactor | CONTACTOR |

▼ Expected Value Settings

| | No. | Variable | Comment | Reset Type | ServoA01_Contactor | ServoA02_Contactor | ServoB01_Contactor | ServoB02_Contactor |
|---|---|---|---|---|---|---|---|---|
| ☐ | 1 | ZoneA_EmergencyStop | EMERGENCY STOP | Manual | 0 | 0 | 0 | 0 |
| ☑ | 2 | ZoneB_EmergencyStop | EMERGENCY STOP | Manual | 1 | 1 | 0 | 0 |
| ☑ | 3 | ZoneA_LightCurtain01 | LIGHT CURTAIN | Manual | 0 | 0 | 1 | 1 |
| ☑ | 4 | ZoneB_LightCurtain01 | LIGHT CURTAIN | Manual | 1 | 1 | 0 | 0 |
| ☑ | 5 | ZoneA_LaserScanner01 | LASER SCANNER | Auto | 0 | 0 | 1 | 1 |
| ☑ | 6 | ZoneB_LaserScanner01 | LASER SCANNER | Auto | 1 | 1 | 0 | 0 |
| ☑ | 7 | ZoneC_SafetyLimitSwitch01 | LIMIT SWITCH/LIMIT S | Manual | 0 | 0 | 1 | 1 |

FIG.14

Last executed date and time: 2016/01/21 10:04:24

| No. | Variable | Comment | Reset Type | ServoA01_Contactor | ServoA02_Contactor | ServoB01_Contactor | ServoB02_Contactor | Test Result | Remarks | Executed Date |
|---|---|---|---|---|---|---|---|---|---|---|
| 1 | ZoneA_EmergencyStop | EMERGENCY STOP | Manual | 0 | 1 | 0 | 1 | Passed | | 2016/01/21 10:04:24 |
| 2 | ZoneB_EmergencyStop | EMERGENCY STOP | Manual | 1 | 0 | 1 | 0 | Passed | | 2016/01/21 10:04:24 |
| 3 | ZoneA_LightCurtain01 | LIGHT CURTAIN | Manual | 0 | 1 | 1 | 1 | Passed | | 2016/01/21 10:04:24 |
| 4 | ZoneB_LightCurtain01 | LIGHT CURTAIN | Manual | 1 | 0* | 1 | 1 | Failed | FOLLOWING OUTPUT VARIABLE HAS BEEN AUTOMATICALLY RESTORED. VARIABLE NAME: ServoA02_Contactor | 2016/01/21 10:04:24 |
| 5 | ZoneA_LaserScanner01 | LASER SCANNER | Auto | 1 | 1 | 0 | 1 | Passed | | 2016/01/21 10:04:24 |
| 6 | ZoneB_LaserScanner01 | LASER SCANNER | Auto | 1 | 1 | 1 | 0 | Passed | | 2016/01/21 10:04:24 |
| 7 | ZoneC_SafetyLimitSwitch | LIMIT SWITCH/LIMIT SWIT | Manual | 0 | 1 | 1 | 1 | Passed | | 2016/01/21 10:04:24 |

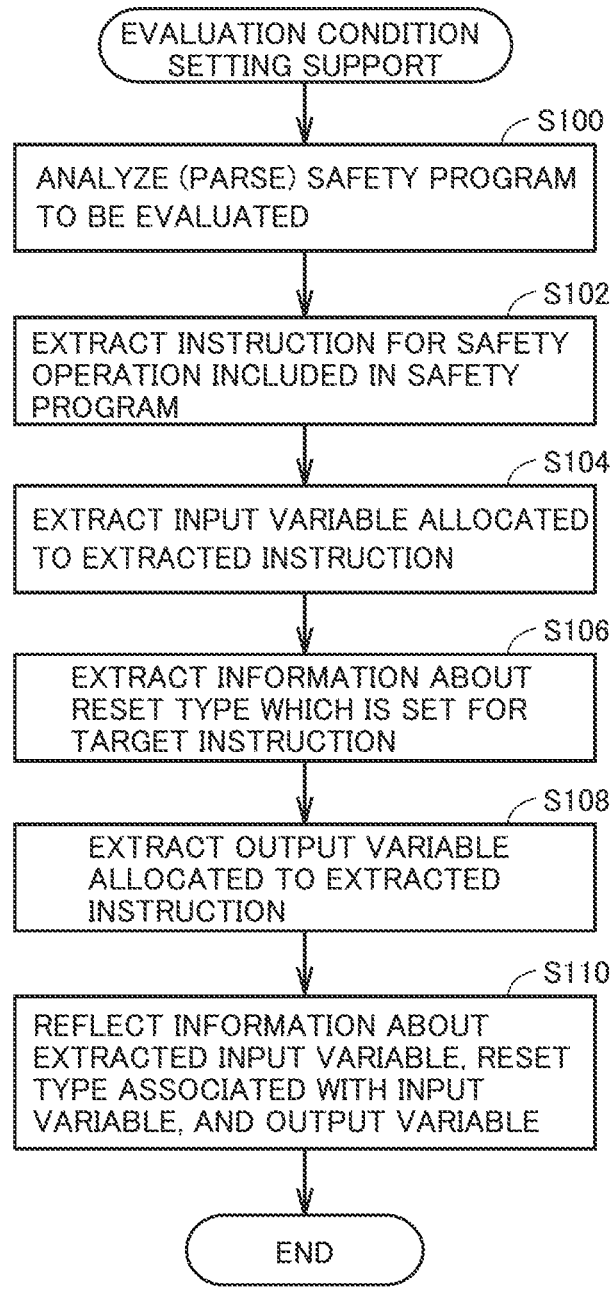

EVALUATION SYSTEM, NON-TRANSITORY STORAGE MEDIUM STORING THEREON EVALUATION PROGRAM, AND EVALUATION METHOD

BACKGROUND OF THE INVENTION

Field of the Invention

The present technique relates to an evaluation system, a non-transitory storage medium storing thereon an evaluation program, and an evaluation method for evaluating functional safety of a safety program.

Description of the Background Art

In order to safely use machines for use at many manufacturing sites, safety equipment (safety components) in compliance with international standards should be used. The safety equipment is intended to prevent people's safety from being threatened by automatically moving devices such as robots. Such safety equipment includes a safety controller which executes a safety program, as well as detection equipment which detects the presence or intrusion of a person, input equipment which receives operation in case of emergency, output equipment which actually stops the equipment, and the like.

Japanese Patent Laying-Open No. 2014-137621 for example discloses, as one of techniques ensuring safety at such manufacturing sites, a method for supporting designing of a user program for a safety controller that can facilitate designing of the user program for the safety controller.

Japanese Patent Laying-Open No. 2014-137621 discloses a configuration in which a safety controller and a safety I/O terminal are connected through a bus-type network, and the safety controller outputs a command for allowing a safety operation to be performed, to safety output equipment which is connected to the safety I/O terminal, based on an input signal from safety input equipment which is connected to the safety I/O terminal.

SUMMARY OF THE INVENTION

For a safety program to be executed in a safety controller, it is necessary to confirm that the program operates as designed in advance. Although Japanese Patent Laying-Open No. 2014-137621 discloses the method for supporting designing of a user program for a safety controller that can facilitate designing of the user program, the above document does not teach a system for inspecting the completed user program for a safety controller.

Therefore, there is a demand for a technique capable of more easily evaluating functional safety of a safety program.

In accordance with an embodiment, there is provided an evaluation system for evaluating functional safety of a safety program for causing a target device to operate with safety maintained, when a predetermined condition is satisfied. The evaluation system includes: a process execution module that determines, based on one or more input signals, a value or values of corresponding one or more output signals by performing an operation in accordance with the safety program; a setting module that receives an evaluation condition including: an input signal to be evaluated; an output signal to be evaluated; and an expected output value which is a value of the output signal to be evaluated and which is to be output in response to change of a value of the input signal to be evaluated; a first determination module that changes the value of the input signal to be evaluated, from a first input value which is an initial value to a second input value, and determines whether a first output value of the output signal to be evaluated which is determined by the process execution module is identical to the expected output value; a second determination module that restores the value of the input signal to be evaluated, from the second input value to the first input value, and determines whether a second output value of the output signal to be evaluated which is determined by the process execution module is identical to the first output value; and an output module that outputs, in association with the input signal to be evaluated, a determination result provided by the first determination module and the second determination module.

The evaluation condition may include a setting of one of: a first type defining that, when the value of the input signal is restored from the second input value to the first input value, an output value of a corresponding output signal should be restored to an original value following the value of the input signal being restored from the second input value to the first input value; and a second type defining that the output value of the corresponding output signal should not be restored to the original value until a predetermined reset condition is satisfied. In a case where the first type is set, the second determination module determines that an operation under the first type is correct when the second output value of the output signal to be evaluated is different from the first output value. In a case where the second type is set, the second determination module determines that an operation under the second type is correct when the second output value of the output signal to be evaluated is identical to the first output value.

The evaluation condition may include a setting of a reset signal as the predetermined reset condition for the second type. The evaluation system may further include a third determination module that makes the reset signal valid after determination by the second determination module, and determines whether a third output value of the output signal to be evaluated which is determined by the process execution module is identical to the first output value.

The evaluation system may further include a fourth determination module that sets the value of the input signal to be evaluated to the first input value before determination by the first determination module, and determines whether a fourth output value of the output signal to be evaluated which is determined by the process execution module is identical to an initial value of the output signal.

As the first input value which is the initial value, a value may be used different from a value indicated in a memory state similar to a state during failure of power supplied to a safety controller executing the safety program.

The output module may incorporate, in the determination result, information indicating which determination module detects an error.

The evaluation condition may include multiple sets each constituted of the input signal to be evaluated, the output signal to be evaluated, and the expected output value. The determination by one or more of the determination modules may be performed for each set of the multiple sets. The output module may incorporate, in the determination result, information indicating which set includes an input signal determined as having an error.

The evaluation condition may include a set of the input signal to be evaluated, a plurality of the output signals to be evaluated, and a plurality of the expected output values corresponding to the output signals. The determination by one or more of the determination modules may be performed for each of the plurality of the expected output values. The output module may incorporate, in the determination result, information indicating which output signal is determined as having an error.

The output module may incorporate, in the determination result, a comment depending on which determination module detects an error.

In accordance with an embodiment, there is provided a non-transitory storage medium storing thereon an evaluation program for evaluating functional safety of a safety program for causing a target device to operate with safety maintained, when a predetermined condition is satisfied. The evaluation program causes, when executed by a processor, the processor to perform: determining, based on one or more input signals, a value or values of corresponding one or more output signals by performing an operation in accordance with the safety program; receiving an evaluation condition including: an input signal to be evaluated; an output signal to be evaluated; and an expected output value which is a value of the output signal to be evaluated and which is to be output in response to change of a value of the input signal to be evaluated; changing the value of the input signal to be evaluated, from a first input value which is an initial value to a second input value, and determining whether a first output value of the output signal to be evaluated which is determined by an operation in accordance with the safety program is identical to the expected output value; restoring the value of the input signal to be evaluated, from the second input value to the first input value, and determining whether a second output value of the output signal to be evaluated which is determined by an operation in accordance with the safety program is identical to the first output value; and outputting, in association with the input signal to be evaluated, a determination result of the steps of determining.

In accordance with an embodiment, there is provided an evaluation method for evaluating functional safety of a safety program for causing a target device to operate with safety maintained, when a predetermined condition is satisfied. The evaluation method includes: determining, based on one or more input signals, a value or values of corresponding one or more output signals by performing an operation in accordance with the safety program; receiving an evaluation condition including: an input signal to be evaluated; an output signal to be evaluated; and an expected output value which is a value of the output signal to be evaluated and which is to be output in response to change of a value of the input signal to be evaluated; changing the value of the input signal to be evaluated, from a first input value which is an initial value to a second input value, and determining whether a first output value of the output signal to be evaluated which is determined by an operation in accordance with the safety program is identical to the expected output value; restoring the value of the input signal to be evaluated, from the second input value to the first input value, and determining whether a second output value of the output signal to be evaluated which is determined by an operation in accordance with the safety program is identical to the first output value; and outputting, in association with the input signal to be evaluated, a determination result of the steps of determining.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a schematic view showing an example of a user interface screen for setting an evaluation condition in the evaluation system in accordance with the present embodiment.

FIG. 14 is a schematic view showing an example of an evaluation result of a functional safety evaluation executed in the evaluation system in accordance with the present embodiment.

FIG. 17 is a flowchart showing a process procedure for a setting support function for an evaluation condition provided by the evaluation system in accordance with the present embodiment.

DESCRIPTION OF THE PREFERRED EMBODIMENTS

Figure 1:
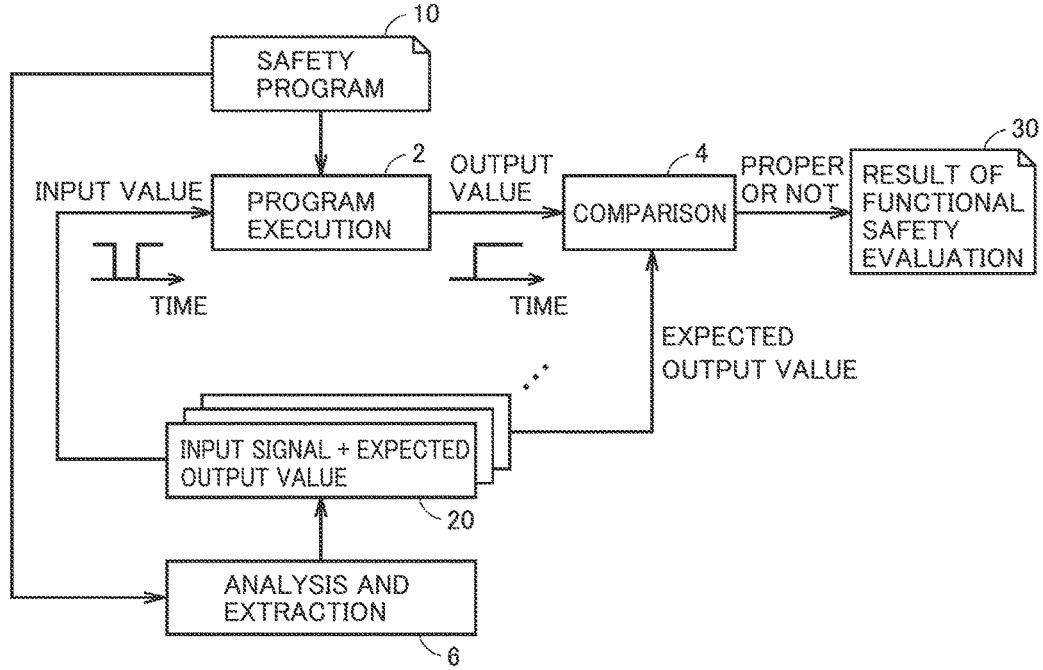
FIG. 1 is a schematic view illustrating, from a functional aspect, an overview of an evaluation system in accordance with the present embodiment.

Embodiments of the present invention will be described in detail with reference to the drawings. It should be noted that identical or corresponding parts in the drawings will be designated by the same reference numerals, and the description thereof will not be repeated.

<A. Overview of Evaluation System>

First, an overview of an evaluation system in accordance with the present embodiment will be described. The evaluation system evaluates functional safety of any safety program.

Herein, "safety program" is a program for causing a target device to operate with safety maintained, when a predetermined condition (safety condition) is satisfied, and refers to a group of instructions defining processing of a safety controller. More specifically, the safety program includes a combination of instructions for determining a value or values of one or more output signals for one or more input signals.

The safety program may be any entity as long as the safety program defines processing of a safety controller. Namely, the safety program may be present as one or more source codes, present as one or more object codes, or in a form (execute form) which can be executed by a processor of the safety controller.

Moreover, the safety program may be written in Function Block Diagram (FBD). Alternatively, the safety program may be written in any of Ladder Diagram (LD), Instruction List (IL), Structured Text (ST), and Sequential Function Chart (SFC), or a combination of them. Still alternatively, the safety program may be written in a general-purpose programming language such as JavaScript® or C language.

It should be noted that the safety program is preferably produced in conformity with regulations published in Technical Committee 5 by PLCopen® which is a third-party association for promoting the PLC programming's international standard IEC 61131-3 (JIS B 3503) and developing and certifying a specification of a vendor-independent standard Function Block Diagram.

Evaluation of functional safety of a safety program that is made by the evaluation system in accordance with the present embodiment refers to inspection of whether or not a behavior of a target safety program meets a proper safety standard. Specifically, a combination of values of variables which are input to the safety program is input, and it is determined whether or not the result of output for the input conforms to a result which should be generated. The evaluation system is capable of automatically conducting an inspection for each combination of such input values.

In the following description, a safety program written as a variable program will be exemplified. Therefore, signals (typically input signal and output signal) which are actually delivered between a safety controller and a safety component or the like are treated each as "variable" in the safety program. Since these actual signals are essentially identical to corresponding variables in the safety program, they may collectively be referred to as "signals" in the following description. Namely, "signal" may herein include, in addition to an electrical signal which is actually delivered, a variable referring to a value allocated to the electrical signal on the safety controller.

Referring to FIG. 1, an evaluation system 1 includes, as its main functions, a program execution function 2, a comparison function 4, and an analysis and extraction function 6.

Program execution function 2 executes processing for each predetermined period or for each occurrence of an event, in accordance with a safety program 10, and outputs the result of the execution. When program execution function 2 executes the program, it acquires one or more input values and executes a logical operation or the like based on the acquired input value(s). An evaluation condition 20 including a combination of an input value and an expected output value corresponding to the input value is prepared in advance, and the input value to safety program 10 is successively updated based on evaluation condition 20.

Comparison function 4 compares an output value which is output when an input value based on evaluation condition 20 is input to program execution function 2, with an expected output value corresponding to the input value in evaluation condition 20. When they are identical to each other, it is determined that a primary safety operation is sound.

In evaluation condition 20, an input value and an expected output value corresponding to the input value are stored, and a condition for a restoration operation is also stored. For the functional safety evaluation in accordance with the present embodiment, an input value which has previously been input is changed or maintained in accordance with the set condition for the restoration operation. It is also determined whether or not changing or maintaining of the output value as the input value is changed or maintained meets the condition for the restoration operation.

Thus, in the present embodiment, it is evaluated whether or not a proper safety operation is executed in response to an input value which is given to serve as a trigger for the safety operation (evaluation of a primary safety operation), and additionally it is evaluated whether a stopped state or the like is maintained or the stopped state returns to a normal operating state when the input value serving as a trigger for the safety operation returns to its original value (evaluation of a secondary safety operation). It should be noted that, for the evaluation of the secondary safety operation, it is determined whether or not it is a behavior conforming to the preset condition for the restoration operation.

The result of the evaluation as described above may be output, as a result of functional safety evaluation 30, onto a screen or paper.

Evaluation system 1 in accordance with the present embodiment may be equipped with a function of automatically extracting an input value which is defined in safety program 10 and automatically generating a list of input values necessary for evaluation condition 20. If there are many logics (safety passes) included in safety program 10, it is difficult to manually extract all relations between input values and output values. In view of this, in evaluation system 1 in accordance with the present embodiment, analysis and extraction function 6 analyzes safety program 10, extracts an input value or the like included therein, and supports generation of evaluation condition 20. Such a support function can be implemented to more reliably evaluate functional safety.

In the following, a process of conducting a functional safety evaluation and a process of supporting generation of evaluation condition 20 for example will be described in more detail.

<B. Hardware Configuration of Evaluation System>

Figure 2:
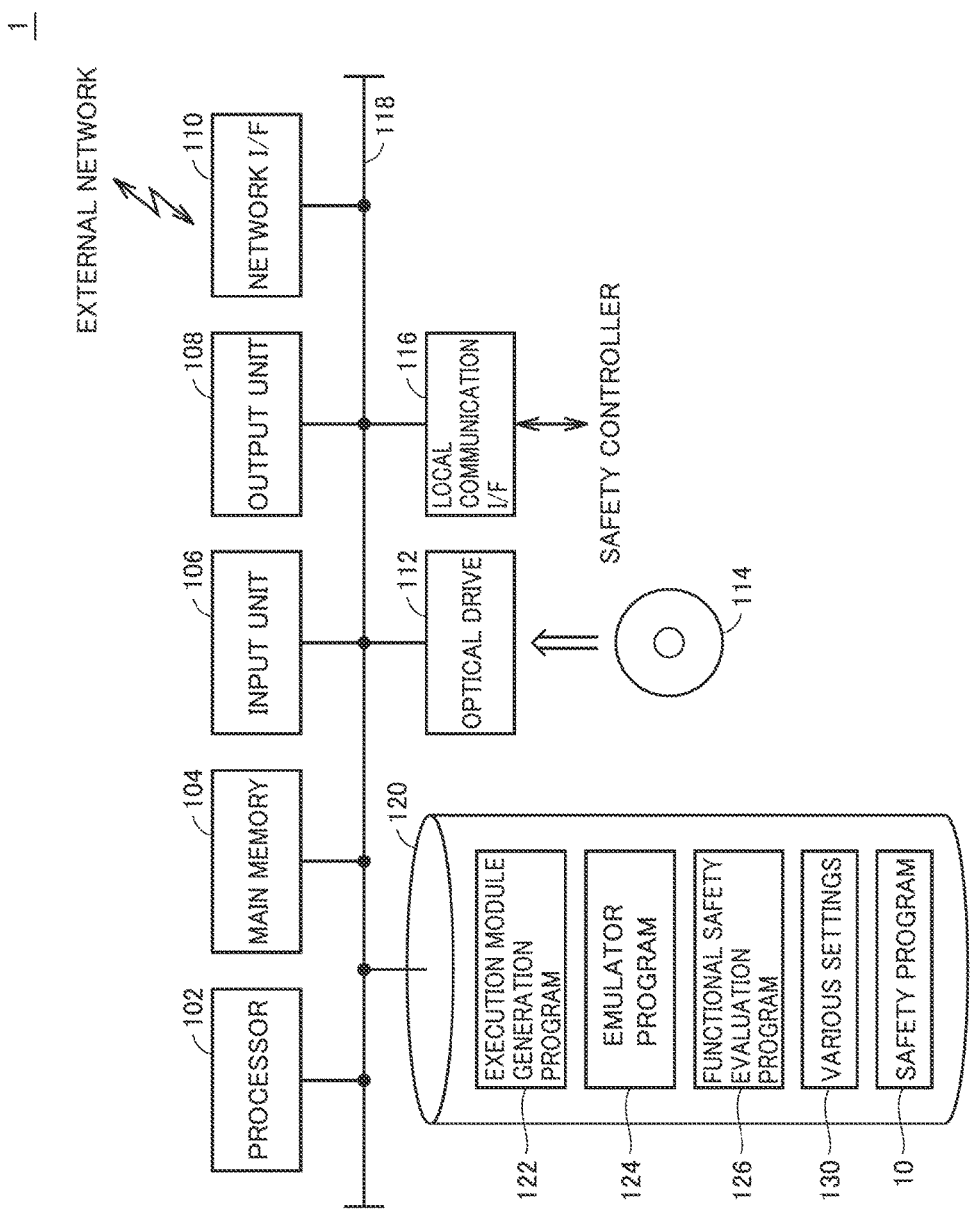
FIG. 2 is a schematic view showing an example of a hardware configuration of the evaluation system in accordance with the present embodiment.

Next, referring to FIG. 2, a hardware configuration of evaluation system 1 will be exemplified.

Evaluation system 1 in accordance with the present embodiment shown in FIG. 2 is typically implemented through execution, by a general-purpose computer, of a program installed in advance. Specifically, evaluation system 1 includes, as its main components, a processor 102 executing an operating system (OS) and various programs described later herein, a memory 104 providing a work area for storing data necessary for execution of a program by processor 102, an input unit 106 receiving user's manipulation of a keyboard, mouse, or the like, an output unit 108 which outputs results of processing, such as display, various types of indicators, printer, and the like, a network interface (I/F) 110 for communicating with an external network, an optical drive 112, a local communication interface (I/F) 116 for communicating with the safety controller for example, and an auxiliary storage device 120. These components are connected so that they are capable of data communication with one another through an internal bus 118 or the like.

Evaluation system 1 has optical drive 112 to read various programs from a computer-readable storage medium 114 such as optical storage medium (DVD (Digital versatile Disc) or the like for example) which non-transitorily stores a computer-readable program, and install the read programs in auxiliary storage device 120 or the like. The processing for the evaluation of functional safety in accordance with the present embodiment may be provided as a part of a development environment program which provides functions such as setting, programming, debugging for the safety controller.

While various programs to be executed in evaluation system 1 may be installed through computer-readable storage medium 114, the programs may alternatively be installed by being downloaded from a server device or the like on the network. Moreover, programs for the evaluation of functional safety in accordance with the present embodiment may alternatively be implemented through use of a part of modules provided by an OS. In such a case, all the software modules necessary for implementing the evaluation of functional safety in accordance with the present embodiment are not distributed, but only a part of the modules is distributed. Even in such a case, apparently this is encompassed by the technical scope of the present invention. Moreover, processing for the evaluation of functional safety in accordance with the present embodiment may be implemented as a part of another program or software.

Auxiliary storage device 120 is configured for example as HDD (Hard Disk Drive), SSD (Flash Solid State Drive), or the like, and stores programs to be executed by processor 102. Specifically, auxiliary storage device 120 includes, as programs which provide processing as described later herein, an execution module generation program 122 for generating, from a safety program (source program), a code (execution module) executable by processor 102, an emulator program 124 for emulating the safety controller and executing a safety program (execution module), and a functional safety evaluation program 126 for evaluating functional safety as described later herein. The functions and processing provided by these programs will be described later herein.

Moreover, auxiliary storage device 120 holds a safety program 10 for which an evaluation of functional safety is to be made, as well as various settings 130.

FIG. 2 shows a configuration where a general-purpose computer executes a program to implement the evaluation of functional safety of a safety program in accordance with the present embodiment. Instead of such a configuration, the whole or a part of the configuration may be implemented by hard-wired circuits. For example, functions provided through execution of the aforementioned various programs by processor 102 may be implemented by means of an ASIC (Application Specific Integrated Circuit) or FPGA (Field-Programmable Gate Array).

<C. Software Configuration of Evaluation System>

Figure 3:
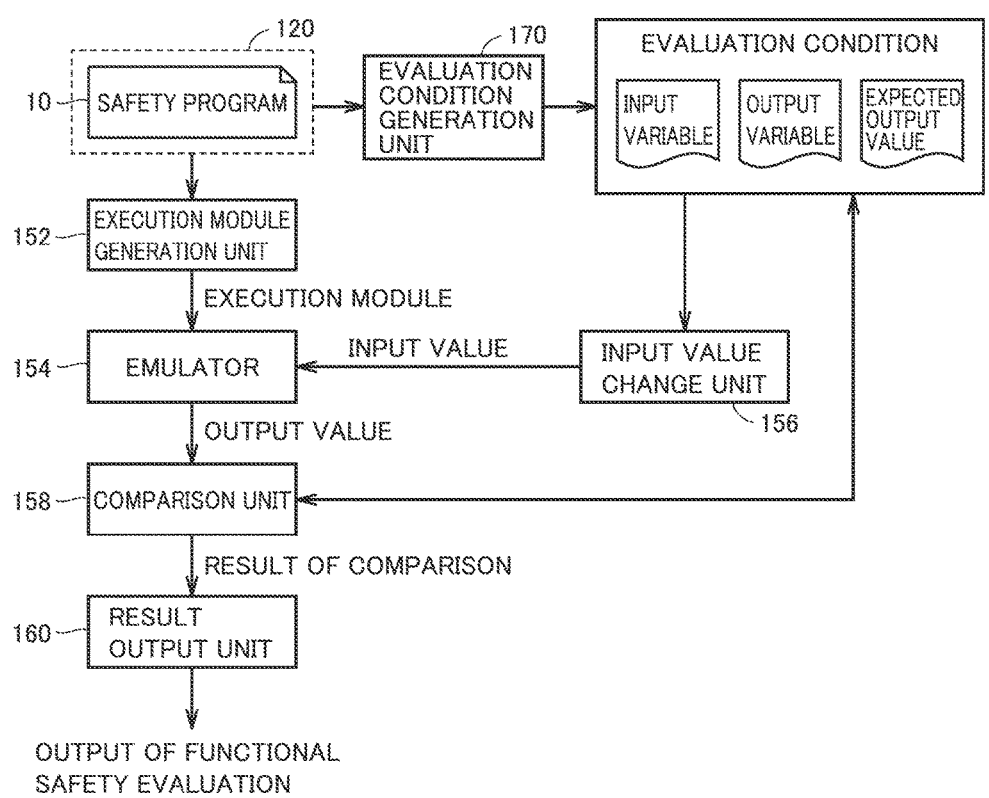
FIG. 3 is a schematic view showing an example of a software configuration of the evaluation system in accordance with the present embodiment.

Next, a software configuration of evaluation system 1 will be exemplified. FIG. 3 is a schematic view showing an example of the software configuration of evaluation system 1 in accordance with the present embodiment. Referring to FIG. 3, evaluation system 1 includes, as its software components, an execution module generation unit 152, an emulator 154, an input value change unit 156, a comparison unit 158, a result output unit 160, and an evaluation condition generation unit 170.

Execution module generation unit 152 is implemented through execution, by processor 102, of execution module generation program 122 (FIG. 2) and generates an execution module from safety program 10. Execution module generation unit 152 typically includes functions of compiler, assembler, linker, and the like.

Emulator 154 is implemented through execution, by processor 102, of emulator program 124 (FIG. 2), and executes the execution program generated by execution module generation unit 152.

Input value change unit 156 provides to emulator 154 an input value for evaluating functional safety, in accordance with an evaluation condition prepared in advance. Comparison unit 158 compares an output value which is calculated by providing to emulator 154 the input value for evaluating functional safety, with an expected output value corresponding to the input value, and outputs the result of the comparison. As to this comparison process, there are multiple types of comparison processes described later herein. Result output unit 160 outputs, as an output of evaluation of functional safety, the result of the comparison from comparison unit 158.

Input value change unit 156, comparison unit 158, and result output unit 160 are implemented through execution of functional safety evaluation program 126 (FIG. 2) by processor 102.

Evaluation condition generation unit 170 analyzes contents of safety program 10 and generates a combination of input values or the like necessary for evaluation of functional safety.

While FIGS. 2 and 3 each exemplify the configuration for executing a safety program using an emulator implemented in a general-purpose computer, an actual safety controller may be used. In the following, with reference to FIGS. 4A and 4B, a specific example configuration of the evaluation system in accordance with the present embodiment will be exemplified.

Figure 4A:
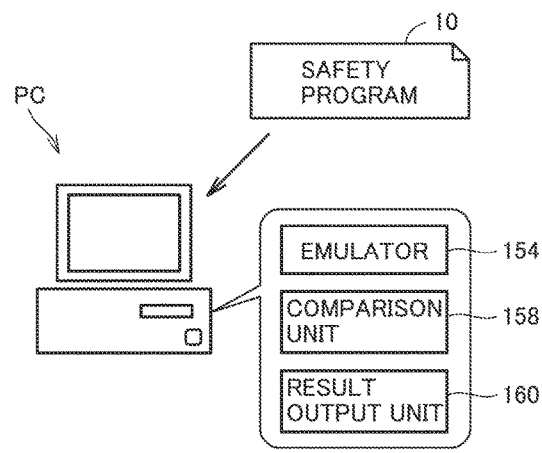
FIGS. 4A and 4B are each a schematic view showing an example configuration of the evaluation system in accordance with the present embodiment.
Figure 4B:
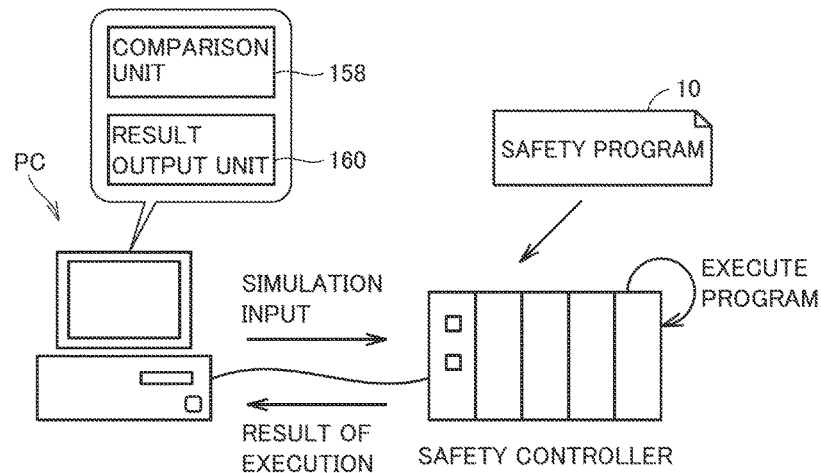

FIG. 4A shows an example where the evaluation system is implemented by a general-purpose computer only, and FIG. 4B shows an example where the evaluation system is implemented by a general-purpose computer and a safety controller.

As shown in FIG. 4A, in the case where the evaluation system is implemented by a general-purpose computer PC only, emulator 154, comparison unit 158, and result output unit 160 are implemented on general-purpose computer PC.

In contrast, in the case where the evaluation system is implemented by general-purpose computer PC and the safety controller, general-purpose computer PC and the safety controller are connected so that they can deliver data to/from each other. Moreover, comparison unit 158 and result output unit 160 are implemented on general-purpose computer PC and target safety program 10 is executed on the safety controller.

Thus, evaluation system 1 has a process executing function of executing an operation in accordance with safety program 10 based on one or more input signals to thereby determine the value(s) of corresponding one or more output signals. This process executing function can be implemented in an environment in which safety program 10 can actually or virtually be executed.

<D. Safety Program>

Next, referring to FIG. 5, an example of a safety program to be evaluated by evaluation system 1 in accordance with the present embodiment will be described. In connection with the present embodiment, an example will be illustrated where the safety program is written in Function Block Diagram (FBD) conforming to International Standard IEC 61131-3 (JIS B 3503).

Figure 5:
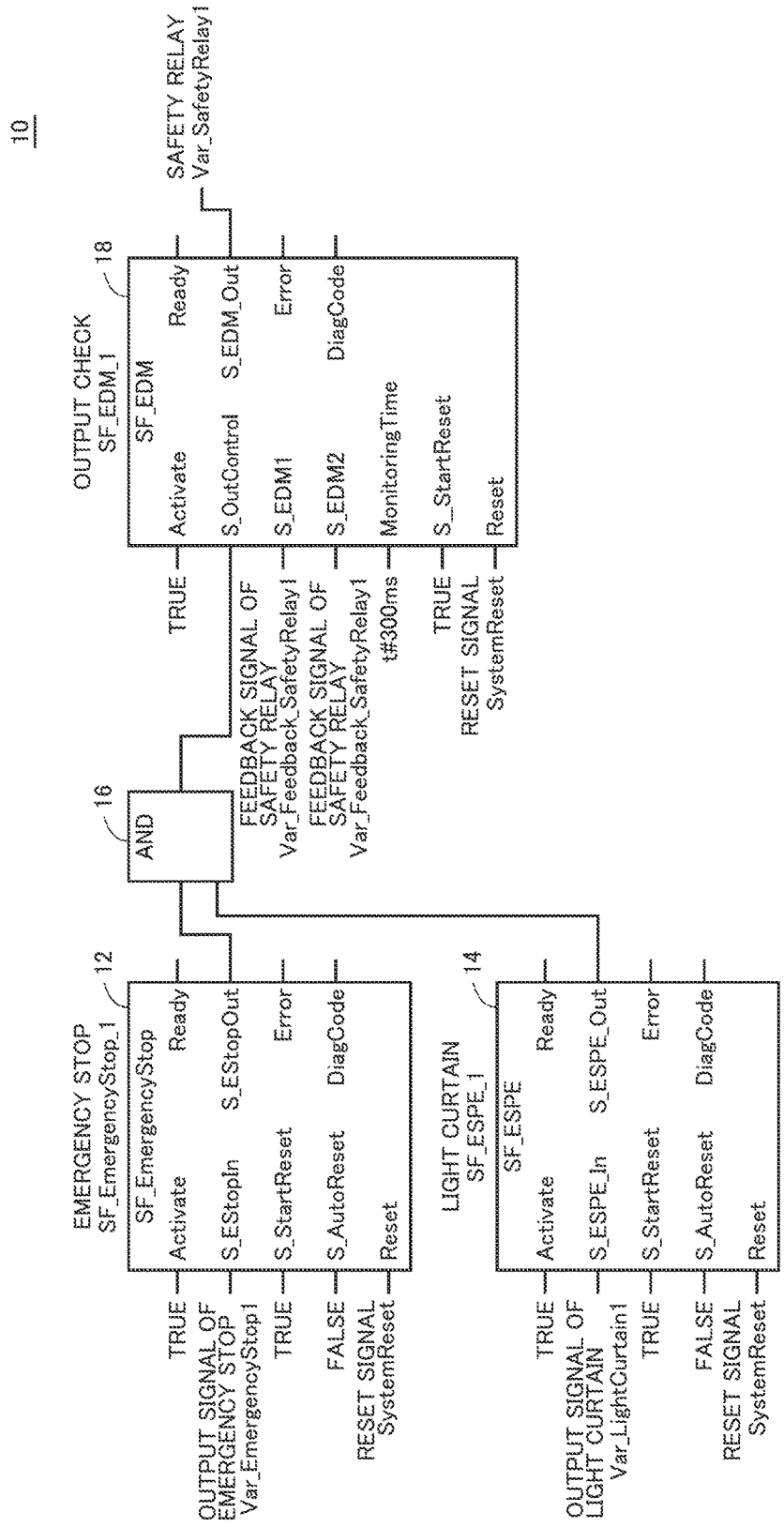
FIG. 5 is a schematic view showing an example of a safety program to be evaluated by the evaluation system in accordance with the present embodiment.

Safety program 10 shown in FIG. 5 is typically configured for a facility or the like in which a certain robot is disposed, a dangerous area around the robot is enclosed by a safety fence, and a person can enter and exit the area through a part of the safety fence. It is supposed that the part through which a person enters and exits the dangerous area is equipped with a light curtain, and an emergency stop button, which is capable of making an emergency stop of the robot upon occurrence of a critical incident, is provided around the safety area.

Safety program 10 shown in FIG. 5 includes two emergency stop function blocks (hereinafter also referred to as "emergency stop FB") 12, 14, an output check function block (hereinafter also referred to as "output check FB") 18, and an AND block 16 connecting them. Emergency stop FB 12 is a logic for processing an input signal from the emergency stop button, and emergency stop FB 14 is a logic for processing an input signal from the light curtain.

Safety program 10 to be evaluated by evaluation system 1 in accordance with the present embodiment is written by variable programming. Namely, each of signals which are output from the emergency stop button and the light curtain is allocated to a unique internal variable in accordance with a predetermined setting. In safety program 10, for each function block, an appropriate internal variable is logically associated with the input or output to thereby implement an intended operation.

Emergency stop FBs 12, 14 each have total five inputs, namely "Activate" for setting processing of the function block valid/invalid, "S_EStopIn" to which a signal which is output from a safety component for emergency stop is input, "S_StartReset" to which a signal for setting whether to start execution of a program after reset is input, "S_AutoReset" to which a signal for setting a reset type after a safety operation is input, and "Reset" to which a signal for resetting an operation after the safety operation is input.

Emergency stop FBs 12, 14 each also has total four outputs, namely "Ready" from which a signal indicating whether or not the function block is in an operating state is output, "S_EStopOut" from which a signal for giving an instruction to perform a safety operation is output, "Error" from which a signal indicating occurrence of a certain error is output, and "DiagCode" from which a code corresponding details of the generated error is output.

In the present embodiment, safety program 10 defines an input value and an output value in a normal state as "TRUE" ("1" or "true"). Namely, when a safety operation is to be performed under a certain condition, an input value serving as a trigger for the safety operation changes to "FALSE ("0" or "false") and accordingly the output value is also "FALSE." In response to the output value "FALSE," a target apparatus performs the safety operation.

As "TRUE" which is set as an initial value of the input signal and the output signal, a value is used different from a value (namely "FALSE") which is indicated in a memory state similar to a state during failure of the power to be supplied to the safety controller executing safety program 10. Namely, a value different from a value indicated in a state where no charge is held in a non-volatile memory of the safety controller is used to implement the so-called fail-safe of performing a safety operation upon occurrence of a failure of hardware can be implemented.

Allocation of values to the input value and the output value in a normal state and an emergency state is a matter of design and may be any. It should be noted, however, preferably the input value and the output value in a normal state are "TRUE," from the fail-safe respect as described above.

In safety program 10 shown in FIG. 5, variable "Var_EmergencyStop1" representing a signal which is output from the emergency stop button is allocated to the input "S_EStopIn" of emergency stop FB 12, and variable "SystemReset" representing system reset for the safety controller is allocated to the input "Reset."

To the input "S_ESPE_In" of emergency stop FB 14, variable "Var_LightCurtain1" representing a signal which is output from the light curtain is allocated, and variable "SystemReset" representing system reset for the safety controller is allocated to the input "Reset."

For "Activate" of each of emergency stop FBs 12, 14, "TRUE" namely valid processing is set. For "S_StartReset" thereof, "TRUE" namely execution of a program after reset is set. For "S_AutoReset" thereof, "FALSE" namely "manual rest" is set as a reset type.

At each of emergency stop FBs 12, 14, basically when a variable which is input to "S_EStopIn" becomes "FALSE," the output value of "S_EStopOut" changes to "FALSE". After such a safety operation, the output value of "S_EStopOut" is reset or maintained, depending on the value of a variable which is input to "S_EStopIn" and/or the value of a variable which is input to "Reset" in accordance with a set reset type.

"S_ESPE_Out" from respective emergency stop FB 12 and emergency stop FB 14 are input to AND block 16, and a logical product of them is input to output check FB 18.

Output check FB 18 is a logic for checking whether or not a safety component responsible for a safety operation functions as instructed. Output check FB 18 has total seven inputs, namely "Activate" for setting processing of the function block valid/invalid, "S_OutControl" to which a signal representing an operation command for a safety component is input, "S_EDM1" and "S_EDM2" to which a signal representing a state value of a safety component is input, "MonitoringTime" to which a value representing a soundness monitor period is input, "S_StartReset" to which a signal for setting whether to start execution of a program after reset is input, and "Reset" to which a signal for resetting the state value after the safety operation is input.

Moreover, output check FB 18 has total four outputs, namely "Ready" from which a signal indicating whether or not the function block is in an operating state is output, "S_EDM_Out" from which a final signal for giving an instruction to perform a safety operation for a safety component is output, "Error" from which a signal indicating occurrence of a certain error is output, and "DiagCode" from which a code corresponding to details of the generated error is output.

Output check FB 18 changes a command value to be provided to a target safety component from "S_EDM_Out" in response to an input value to "S_OutControl" and determines whether or not a state value of the safety component is identical to the command value. In this way, non-operation due to disconnection or the like of a safety relay and a malfunction such as permanent operation due to contact welding or the like can be detected.

While safety program 10 shown in FIG. 5 is an example of a simple logic, the program may be configured to receive more input signals and provide a command value to more safety components.

<E. Reset Type>

Next, a description will be given of a reset type which is set for emergency stop FB included in safety program 10 shown in FIG. 5. As described above, "auto reset" and "manual reset" can be selectively set for emergency stop FB by way of example.

"Auto reset" is suitable for such a case where a safety operation is performed only during a period in which an input signal from a safety component such as light curtain is "FALSE." For example, "auto reset" can be used under a situation where the device is stopped only during a period in which a person has broken into the dangerous area while the device is operated in other states. Such "auto reset" can be set to reduce an influence on the cycle time while safety of workers is ensured.

"Manual reset" is a common reset type and suitable for such a case where a safety component such as emergency stop button is operated to perform a safety operation and thereafter a predetermined restoration operation is necessary for effecting reset. For example, in the case where the emergency stop button is operated and the device is stopped in the middle of work, for example, it is preferable to return the device to its initial position and then effect reset.

As seen from the above, the reset type includes "auto reset" (first type) defining that, when a value of the input signal is restored from "FALSE" (second input value) to "TRUE" (first input value), an output value of the corresponding output signal should be restored to an original value following the input signal restored from "FALSE" to "TRUE," and "manual reset" (second type) defining that the output value of the output signal should not be restored to the original value until a predetermined reset condition is satisfied.

Figure 6A:
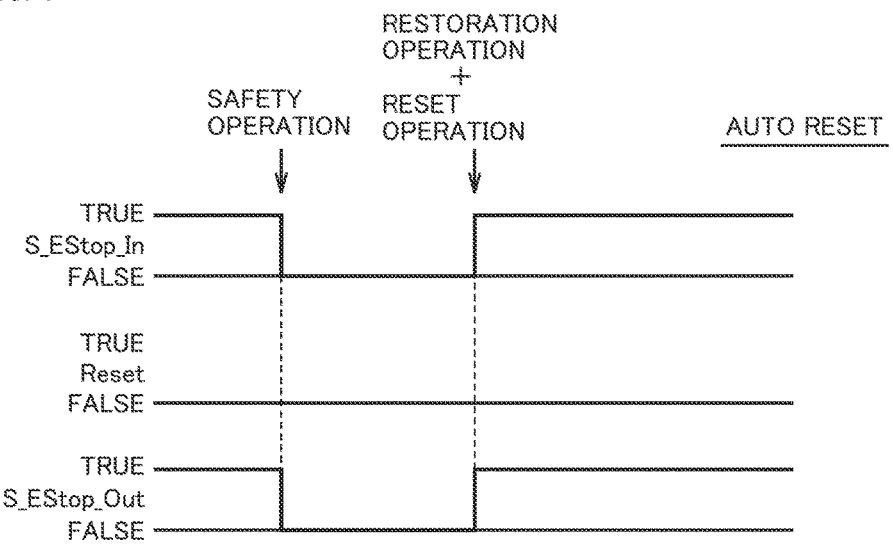
FIGS. 6A and 6B are each a diagram for illustrating a reset type which is set for an emergency stop FB included in a safety program in accordance with the present embodiment.
Figure 6B:
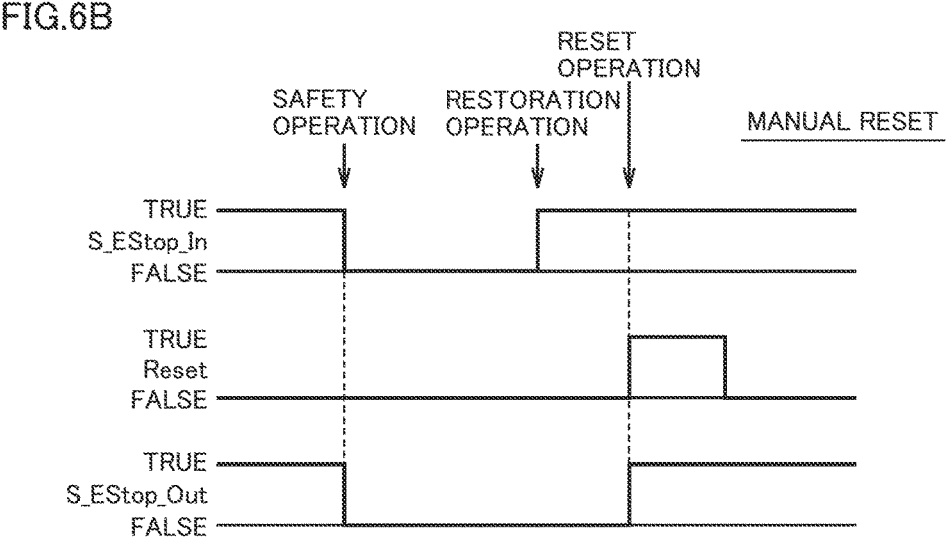

FIGS. 6A and 6B are each a diagram for illustrating a reset type which is set for the emergency stop FB included in safety program 10 in accordance with the present embodiment.

FIG. 6A shows a case where "auto reset" is set as a reset type, and FIG. 6B shows a case where "manual reset" is set as a reset type.

In the case of "auto reset" shown in FIG. 6A, as input "S_EStopIn" of the emergency stop FB changes from "TRUE" to "FALSE," output "S_EStopOut" of the emergency stop FB changes from "TRUE" to "FALSE." This change of "S_EStopOut" causes a safety operation to be performed. After this, as input "S_EStopIn" of the emergency stop FB is restored from "FALSE" to "TRUE," the reset operation is performed together. Namely, in conjunction with input "S_EStopIn" of the emergency stop FB, output "S_EStopOut" of emergency stop FB changes.

In evaluation system 1 in accordance with the present embodiment, for an output variable for which "auto reset" is set, it is confirmed that the value of the output variable changes in conjunction with change of the value of the corresponding input variable.

In the case of "manual reset" shown in FIG. 6B, after input "S_EStopIn" of the emergency stop FB changes from "TRUE" to "FALSE" and output "S_EStopOut" of the emergency stop FB changes from "TRUE" to "FALSE," even when input "S_EStopIn" of the emergency stop FB is restored from "FALSE" to "TRUE," output "S_EStopOut" of the emergency stop FB is maintained at "FALSE." In this state, as input "Reset" of the emergency stop FB changes from "FALSE" to "TRUE," output "S_EStopOut" of the emergency stop FB changes from "FALSE" to "TRUE."

In evaluation system 1 in accordance with the present embodiment, it is confirmed that the value of the output variable for which "manual reset" is set is still maintained even after the value of the corresponding input variable changes after execution of a safety operation, and confirmed that, when a variable for reset is input, the variable is reset to an initial value.

<F. Overall Procedure of Functional Safety Evaluation>

Next, an overall procedure for functional safety evaluation provided by evaluation system 1 in accordance with the present embodiment will be described.

Figure 7:
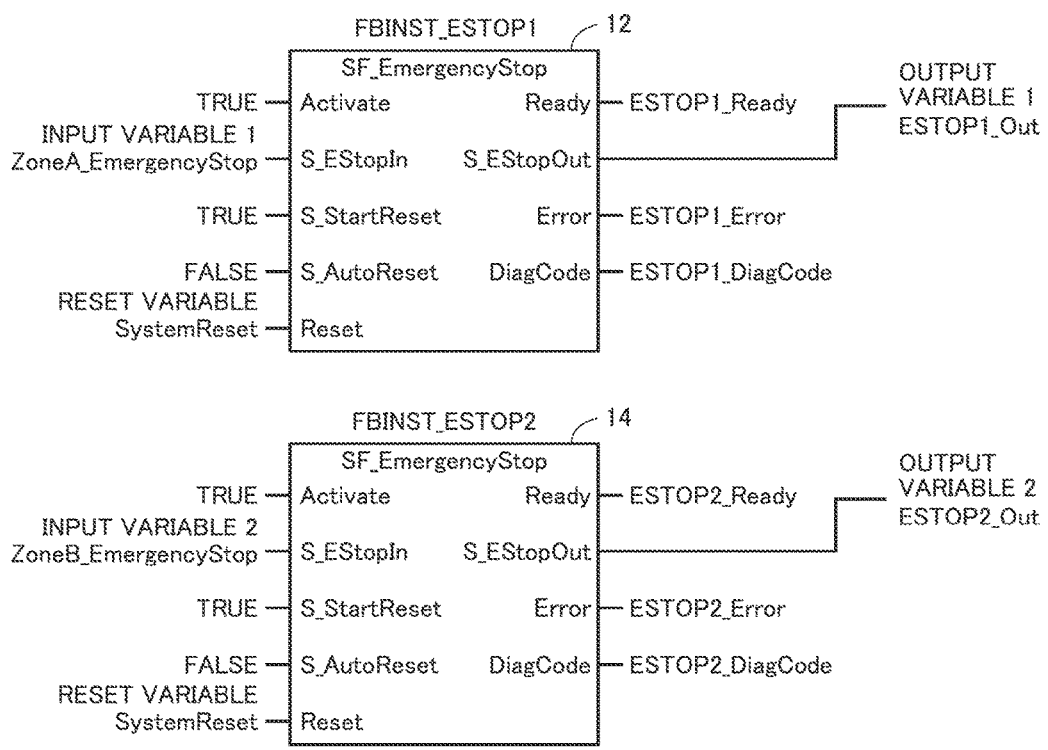
FIG. 7 is a schematic view showing another example of the safety program to be evaluated by the evaluation system in accordance with the present embodiment.
Figure 8A:
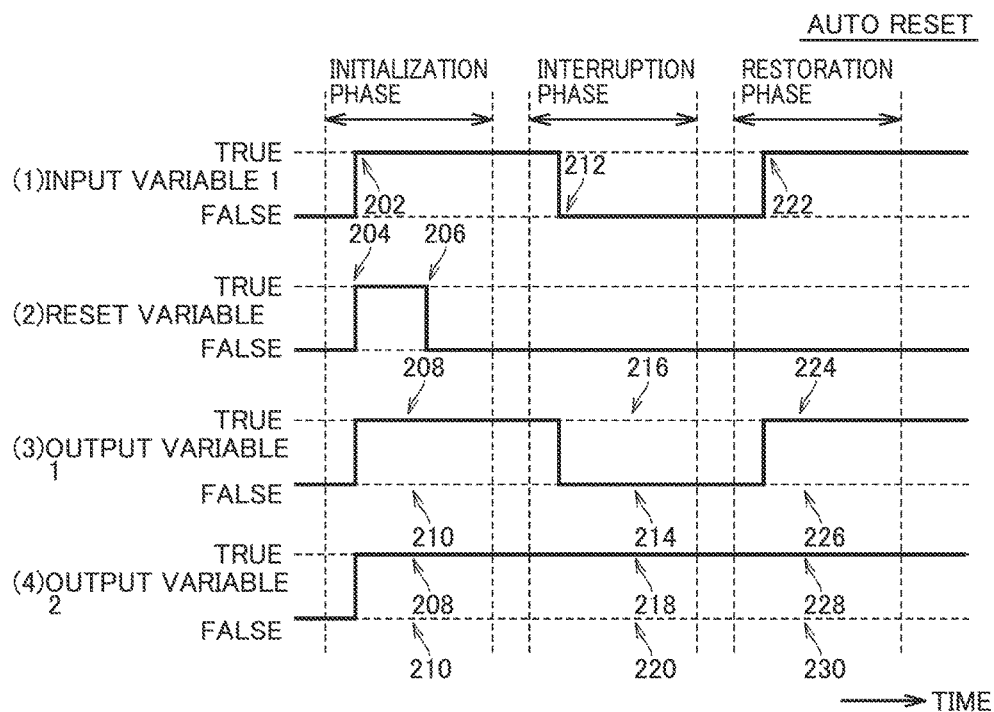
FIGS. 8A and 8B are each a time chart illustrating an example of a procedure for a functional safety evaluation in accordance with the present embodiment.
Figure 8B:
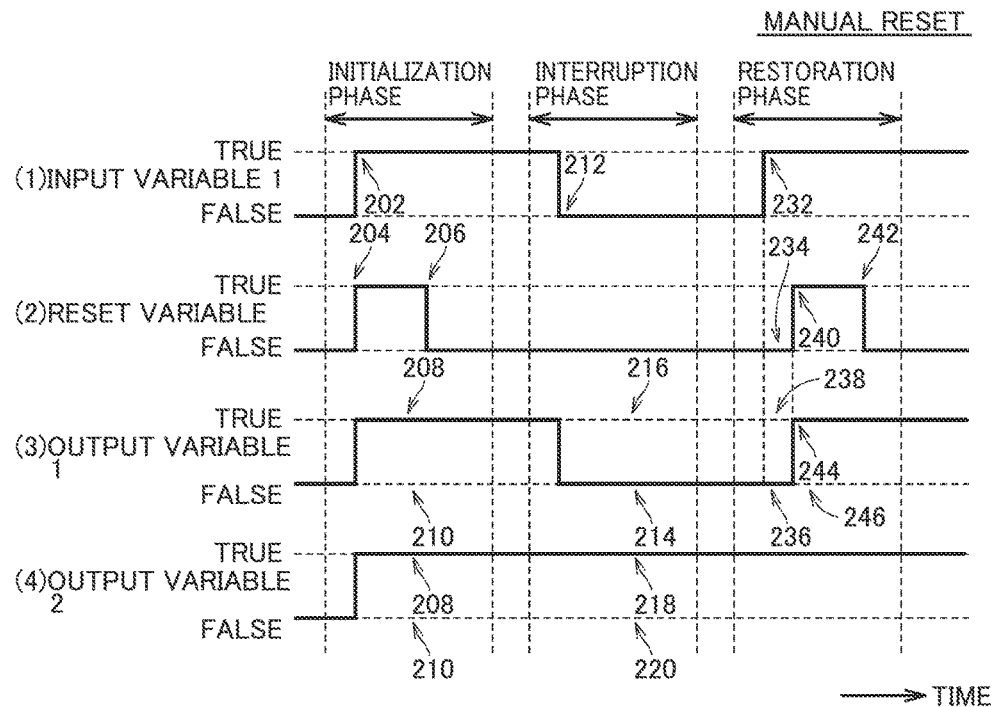

FIG. 7 is a schematic view showing another example of safety program 10 to be evaluated by evaluation system 1 in accordance with the present embodiment. FIGS. 8A and 8B are each a time chart illustrating an example of a procedure for a functional safety evaluation in accordance with the present embodiment. In FIGS. 8A and 8B each, the procedure in the case where the functional safety evaluation is applied to safety program 10 shown in FIG. 7 is illustrated in time series. In safety program 10 shown in FIG. 7, a variable which is input to "S_EStopIn" of emergency stop FB 12 is referred to as "input variable 1" and a variable which is input to "S_EStopIn" of emergency stop FB 14 is referred to as "input variable 2." A variable which is commonly input to "Reset" of emergency stop FBs 12, 14 is referred to as "reset variable" and a variable which is output from "S_EStopOut" of emergency stop FB 12 is refereed to as "output variable 1." It should be noted that the variable which is output from "S_EStopOut" of emergency stop FB 14 is not shown in FIGS. 8A and 8B.

FIG. 8A shows an example where "auto reset" is set for the output variable, and FIG. 8B shows an example where "manual reset" is set for the output variable.

The functional safety evaluation in accordance with the present embodiment typically includes three phases (initialization phase, interruption phase, restoration phase). In the initialization phase, it is confirmed that output variables have become a proper initial state in response to setting of all input variables to a predetermined initial value. In the interruption phase, it is confirmed that an output variable has changed to a proper value and/or confirmed that an output variable has not changed in response to change of a set input variable corresponding to the output variable to a value representing a safety operation. In the restoration phase, it is confirmed that reset of a specified type is effected in response to change of the input variable and/or reset variable.

In the procedure for the functional safety evaluation shown in FIGS. 8A and 8B, output variable 1 is a variable for which "TRUE" is set as an expected value, and which is intended to follow input variable 1. In contrast, output variable 2 is a variable for which "FALSE" is set as an expected value, and which is intended not to follow input variable 1. A determination process described below is performed by comparison function 4 shown in FIG. 1 and comparison unit 158 shown in FIG. 3.

Referring first to FIG. 8A, a procedure for the functional safety evaluation in the case where "auto reset" is set as a reset type will be described.

In the initialization phase, the value of an input signal to be evaluated is set to an initial value (first input value), and it is determined whether or not the value (fourth output value) of an output signal to be evaluated which is determined by processing in accordance with safety program 10 is identical to the initial value of the output signal.

Specifically, all of registered input variables are set to "TRUE" (reference 202). Moreover, after the reset variable is once set to "TRUE" (reference 204), the reset variable is set to "FALSE" (reference 206). It is confirmed that all of registered output variables are "TRUE" (reference 208) in response to the above change of the variables. When any output variable is still "FALSE," it is determined that there is a certain error (reference 210).

In the subsequent interruption phase, the value of the input signal to be evaluated is changed from the initial value "TRUE" (first input value) to "FALSE" (second input value), and it is determined whether or not the value (first output value) of the output signal to be evaluated which is determined by processing in accordance with safety program 10 is identical to a corresponding expected output value.

Specifically, specific input variable 1 is set from "TRUE" to "FALSE" (reference 212). It is confirmed that output variable 1 is "FALSE" in response to the above change of the input variable (reference 214). This output variable 1 is a variable for which setting of an expected value is checked (which is intended to follow input variable 1). When output variable 1 is "TRUE," it is determined that output variable 1 does not follow input variable 1 and there is a certain error (reference 216). Meanwhile, it is confirmed that output variable 2 is "TRUE" (reference 218). Output variable 2 is a variable for which setting of an expected value is not checked (which is intended not to follow input variable 1). When output variable 2 is "FALSE," it is determined that output variable 2 follows input variable 1 and there is a certain error (reference 220).

In the final restoration phase, the value of the input signal to be evaluated is restored from "FALSE" (second input value) to "TRUE" (first input value), and it is determined whether or not the value (second output value) of the output signal to be evaluated which is determined by processing in accordance with safety program 10 is identical to the value (first output value) in the interruption phase.

Specifically, input variable 1 is set from "FALSE" to "TRUE" (reference 222). At this time, the reset variable is maintained at "FALSE." It is confirmed that all of registered output variables are "TRUE" in response to the above change of the input variable (references 224, 228). When any output variable is "FALSE," it is determined that there is a certain error (references 226, 230).

As seen from the above, in the case where "auto reset" (first type) is set, an operation under "auto reset" is determined as being correct when the output value of the output signal to be evaluated is different from "FALSE" (first output value) upon restoring the value of the input signal from "FALSE" to "TRUE."

Referring next to FIG. 8B, a procedure for the functional safety evaluation in the case where "manual reset" is set as a reset type will be described. In the procedure for the functional safety evaluation in the case where "manual reset" is set, the initialization phase and the interruption phase are identical respectively to the initialization phase and the interruption phase of "auto reset" shown in FIG. 8A. Therefore, the description thereof will not be repeated.

In the restoration phase, input variable 1 is set from "FALSE" to "TRUE" (reference 232). At this time, the reset variable is maintained at "FALSE." It is confirmed that output variable 1 is "FALSE" when the above change of the input variable is made (reference 236), where output variable 1 is a variable for which setting of an expected value is checked (which is intended to follow input variable 1). If output variable 1 changes to "TRUE," it means that output variable 1 follows input variable 1 without waiting for the change of the reset variable and it is determined that there is a certain error (reference 238).

Subsequently, the reset variable is once set to "TRUE" (reference 240) and thereafter set to "FALSE" (reference 242). It is confirmed that all of registered output variables are "TRUE" in response to the above change of the reset variable (reference 244). When any output variable is "FALSE," it is determined that there is a certain error (reference 246).

As seen from the above, in the case where "manual reset" (second type) is set, an operation under "manual reset" is determined as being correct when the output value of the output signal to be evaluated is identical to "FALSE" (first output value) upon restoring the value of the input signal from "FALSE" to "TRUE." Then, the reset signal is made valid and it is determined whether or not the value (third output value) of the output signal to be evaluated which is determined by processing in accordance with safety program 10 is identical to the value (first output value) in the interruption phase.

<G. Setting of Evaluation Condition>

Evaluation system 1 in accordance with the present embodiment automatically executes the functional safety evaluation as shown in FIGS. 8A and 8B. In the following, a method for setting evaluation condition 20 which is necessary for automatically executing the functional safety evaluation for example will be described.

FIG. 9 is a schematic view showing an example of a user interface screen for setting evaluation condition 20 in evaluation system 1 in accordance with the present embodiment. Evaluation system 1 displays a setting screen 300 as shown in FIG. 9 and receives user's setting on setting screen 300.

More specifically, setting screen 300 includes a RUN button 302 for giving an instruction to automatically execute a functional safety evaluation, a display button 304 for displaying a result of execution of the functional safety evaluation, a variable registration button 306 for registering a variable to be evaluated, a reset variable setting area 308 for setting a variable to be used as a reset variable, an input setting display area 310 for displaying a set value for the input variable, an output setting display area 320 for displaying a set value for the output variable, and an expected value setting area 330 for setting an expected value of an output variable (hereinafter also referred to as "expected output value") for an input variable.

In reset variable setting area 308, a variable to be commonly input as a reset signal to the function blocks included in the safety program to be evaluated is set. Namely, evaluation condition 20 includes a setting of the reset signal as a predetermined reset condition for the auto reset. It should be noted that while setting screen 300 shown in FIG. 9 is configured to allow a single reset signal to be commonly entered, separate reset signals may be used for respective function blocks.

In input setting display area 310, information about input variables included in a target safety program can be registered and displayed. In output setting display area 320, information about output variables included in a target safety program can be registered and displayed. Registration of a variable in input setting display area 310 and output setting display area 320 is made effective by selection of variable registration button 306.

Input setting display area 310 includes a variable name display column 312 for displaying a variable name of an input variable which is set in advance, a comment display column 314 for displaying a comment on a corresponding input variable, a reset type display column 316 for displaying a reset type of a corresponding input variable, and an input type display column 318 for displaying an input type of a corresponding input variable.

Output setting display area 320 includes a variable name display column 322 for displaying a variable name of an output variable which is set in advance, and a comment display column 324 for displaying a comment on a corresponding output variable.

Expected value setting area 330 receives an evaluation condition which is necessary for the functional safety evaluation in accordance with the present embodiment. Namely, each row of expected value setting area 330 corresponds to a condition of the functional safety evaluation. Specifically, expected value setting area 330 includes an input variable display area 334 for displaying a target input variable, a comment display column 336 for displaying a comment on a corresponding input variable, a reset type display area 338 for displaying a reset type of a corresponding input variable, and an expected value setting column 340 for setting an expected output value of each output variable for a corresponding input variable.

In expected value setting column 340, output values (expected output values) whose number is equal to the number of output variables for one input variable are set. In the example of setting screen 300 shown in FIG. 9, four columns are provided for four output variables displayed in output setting display area 320, and expected output values can be set in each column. Based on a safety design prepared in advance, a user sets proper values in expected value setting column 340. In expected value setting column 340 in FIG. 9, "0" means that when a corresponding input variable changes to "FALSE," a corresponding output variable also changes to "FALSE" while "1" means that even when a corresponding input variable changes to "FALSE," a corresponding output variable is maintained at "TRUE."

For example, it is supposed that a certain emergency stop button A is configured to trigger a safety operation of a device A which is located in a dangerous area A. For an output variable giving an instruction to a safety relay which is responsible for emergency stop of device A in dangerous area A, associated with an input variable corresponding to an input signal from emergency stop button A, "FALSE" representing a safety operation, namely "0" is set as an expected output value. In contrast, in the case where emergency stop button A is not provided for a dangerous area B and another emergency stop button B is provided in dangerous area B, it is not intended to stop a device B in dangerous area B by manipulation of emergency stop button A. Therefore, for an output variable giving an instruction to a safety relay which is responsible for emergency stop of device B in dangerous area B, associated with an input variable corresponding to an input signal from emergency stop button A, "TRUE" representing no safety operation, namely "1" is set as an expected output value. In this way, in expected value setting column 340, a relation between each input variable and a corresponding output variable is set.

Expected value setting area 330 includes a checkbox 332 for setting whether or not each input variable is to undergo the functional safety evaluation. For the functional safety evaluation in accordance with the present embodiment, the value (input value) of the input variable for which its corresponding checkbox 332 is checked is changed and it is then determined whether or not the value of each output variable is identical to an expected value which is set in expected value setting column 340.

As shown in FIG. 9, expected value setting column 340 receives evaluation condition 20 including an input signal to be evaluated, an output signal to be evaluated, and an expected output value which is a value of the output signal to be evaluated, where the value of the output signal is a value to be output in response to change of the value of the input signal to be evaluated. Usually, evaluation condition 20 may include multiple sets of input signals, output signals, and expected output values.

As described above with reference to FIG. 9, evaluation system 1 in accordance with the present embodiment receives an evaluation condition including an input signal to be evaluated, an output signal to be evaluated, and an expected output value which is a value of the output signal to be evaluated, where the value of the output signal is a value to be output in response to change of the value of the input signal to be evaluated.

Next, a description will be given of an example of a function of facilitating setting of an expected output value in expected value setting column 340 included in setting screen 300 shown in FIG. 9. The expected output value is a part of the evaluation condition.

Evaluation system 1 in accordance with the present embodiment can read external data of expected output values written in a common format (typically CSV (Comma-Separated Values) format or text format), so that setting and reuse of the expected output values can be facilitated. Moreover, expected output values set in advance can be output as data in the common format.

Figure 10:
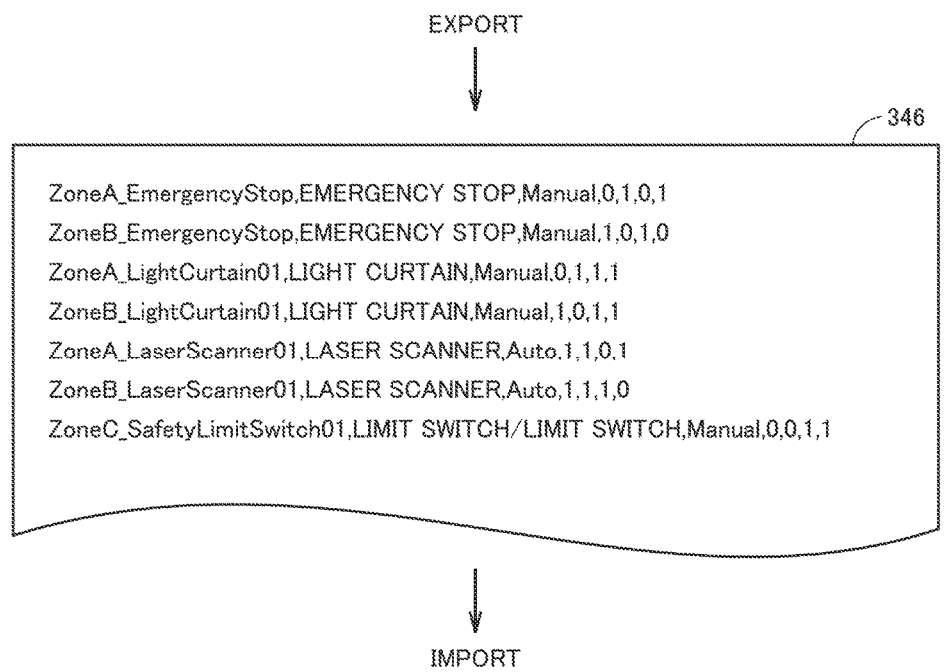
FIG. 10 is a diagram for illustrating an export process and an import process for an expected output value in the evaluation system in accordance with the present embodiment.

FIG. 10 is a diagram for illustrating an export process and an import process for an expected output value in the evaluation system in accordance with the present embodiment. For example, when a user selects an export button 342 (FIG. 9) of setting screen 300, a list of expected output values set in expected value setting column 340 of setting screen 300 is output/stored to/in an external element, as data (external output data 346) in the CSV format.

Moreover, when a user selects an import button 344 (FIG. 9) of setting screen 300, data in the CSV format prepared in advance (external output data 346) is read and each value is set in expected value setting column 340 of setting screen 300.

In this way, the function for enabling output to an external element and reading from an external element of the expected output values prepared as data in a common format is implemented, and accordingly cooperation with another application or the like is strengthened and the functional safety evaluation can be conducted more quickly and easily.

In addition to the cooperation with another application by means of the file shown in FIG. 10, direct use of expected output values set by the other application may be employed.

Figure 11:
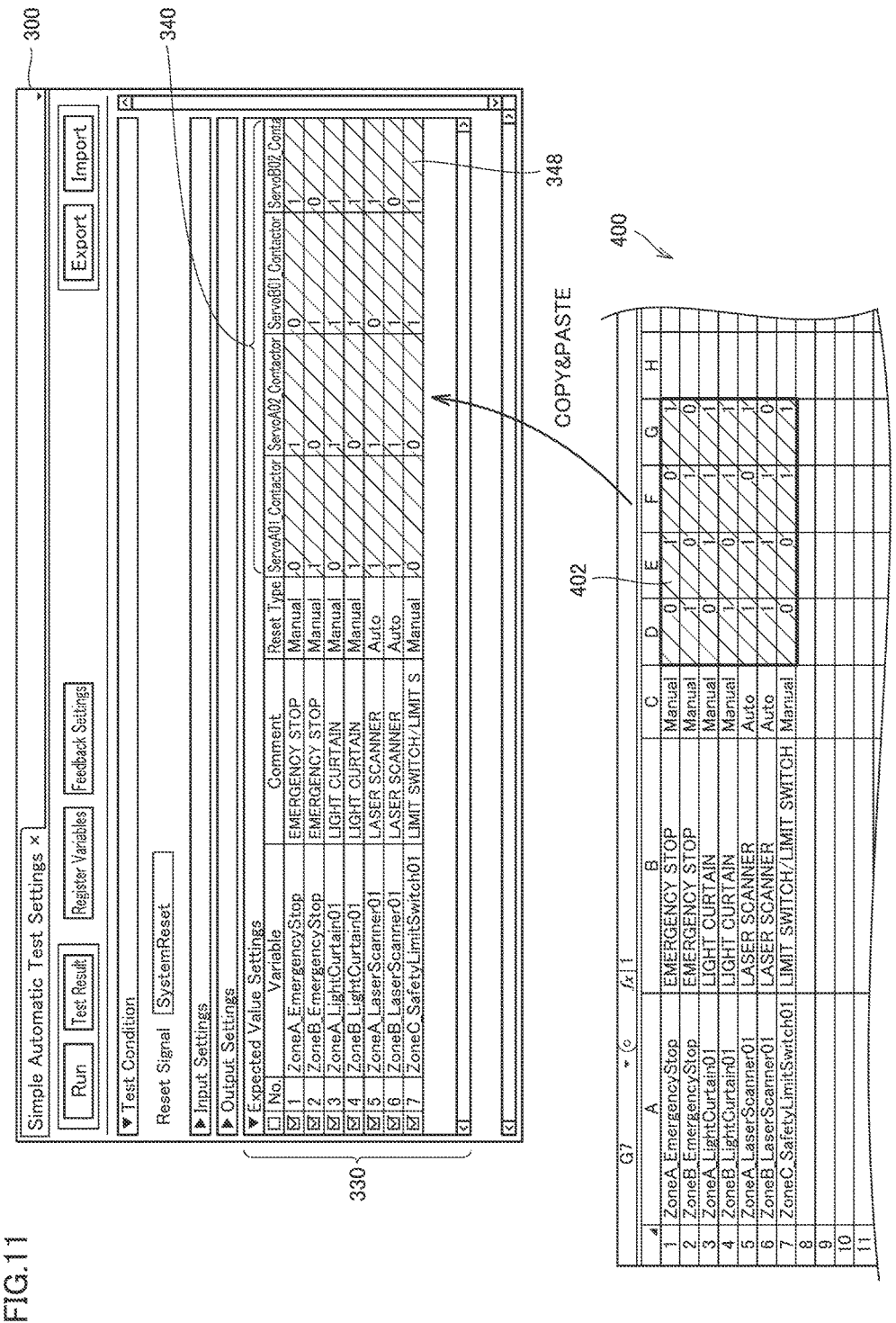
FIG. 11 is a diagram for illustrating a process for setting an expected output value in cooperation with another application, in the evaluation system in accordance with the present embodiment.

FIG. 11 is a diagram for illustrating a process for setting an expected output value in cooperation with another application, in the evaluation system in accordance with the present embodiment. Referring to FIG. 11, on a spreadsheet application 400 for example, a table indicating expected output values to be set in expected value setting column 340 may be generated, a target range 402 in the prepared table may be selected and copied, and the range may be pasted on expected value setting column 340 of setting screen 300 (so-called copy-and-paste), to thereby set expected output values desired by a user.

While FIG. 11 exemplifies, as a typical example, cooperation with the spreadsheet application, this is not a limitation. Cooperation with any application is possible as long as the copy-and-paste can be done in the application.

In this way, by cooperation with another application, expected output values can more easily be set.

<H. Process Procedure for Functional Safety Evaluation>

Next, a process procedure for the functional safety evaluation in accordance with the present embodiment will be described. As a set of an input value to be evaluated and a corresponding expected output value is set in setting screen 300 as shown in FIG. 9, functional safety of a target safety program is evaluated in accordance with the following procedure.

Figure 12:
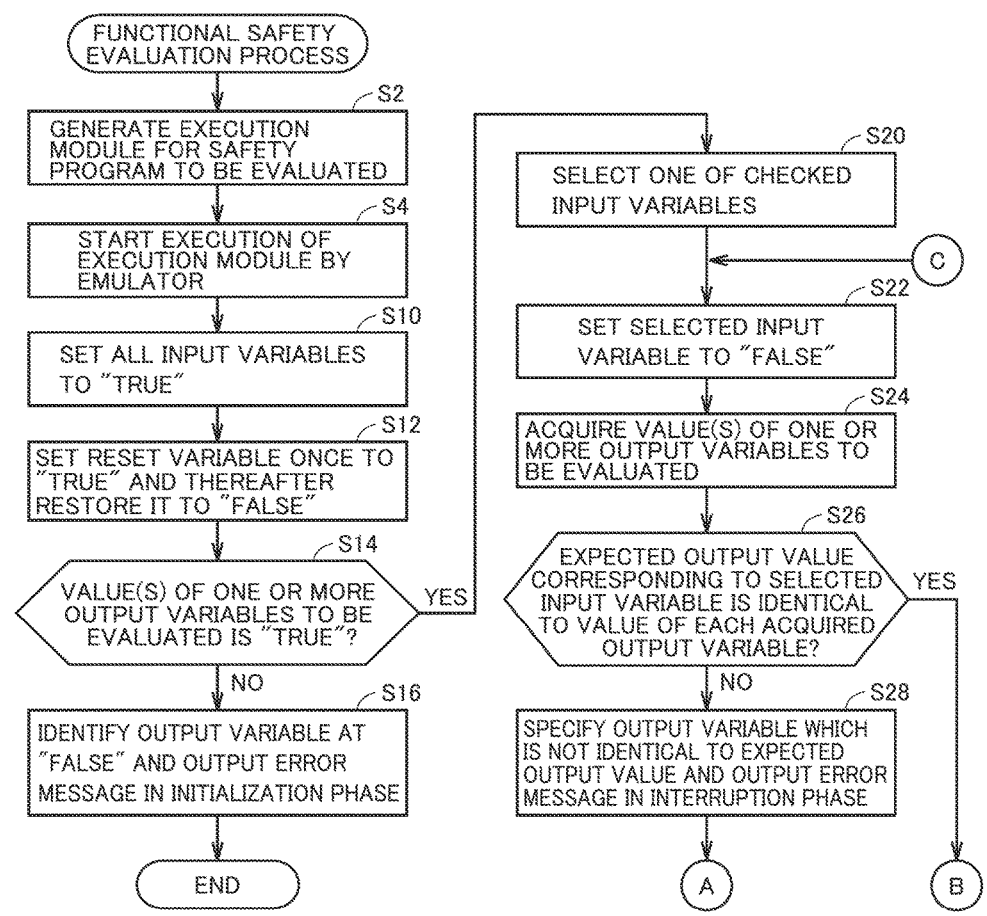
FIG. 12 is a flowchart showing a process procedure for a functional safety evaluation executed in the evaluation system in accordance with the present embodiment.
Figure 13:
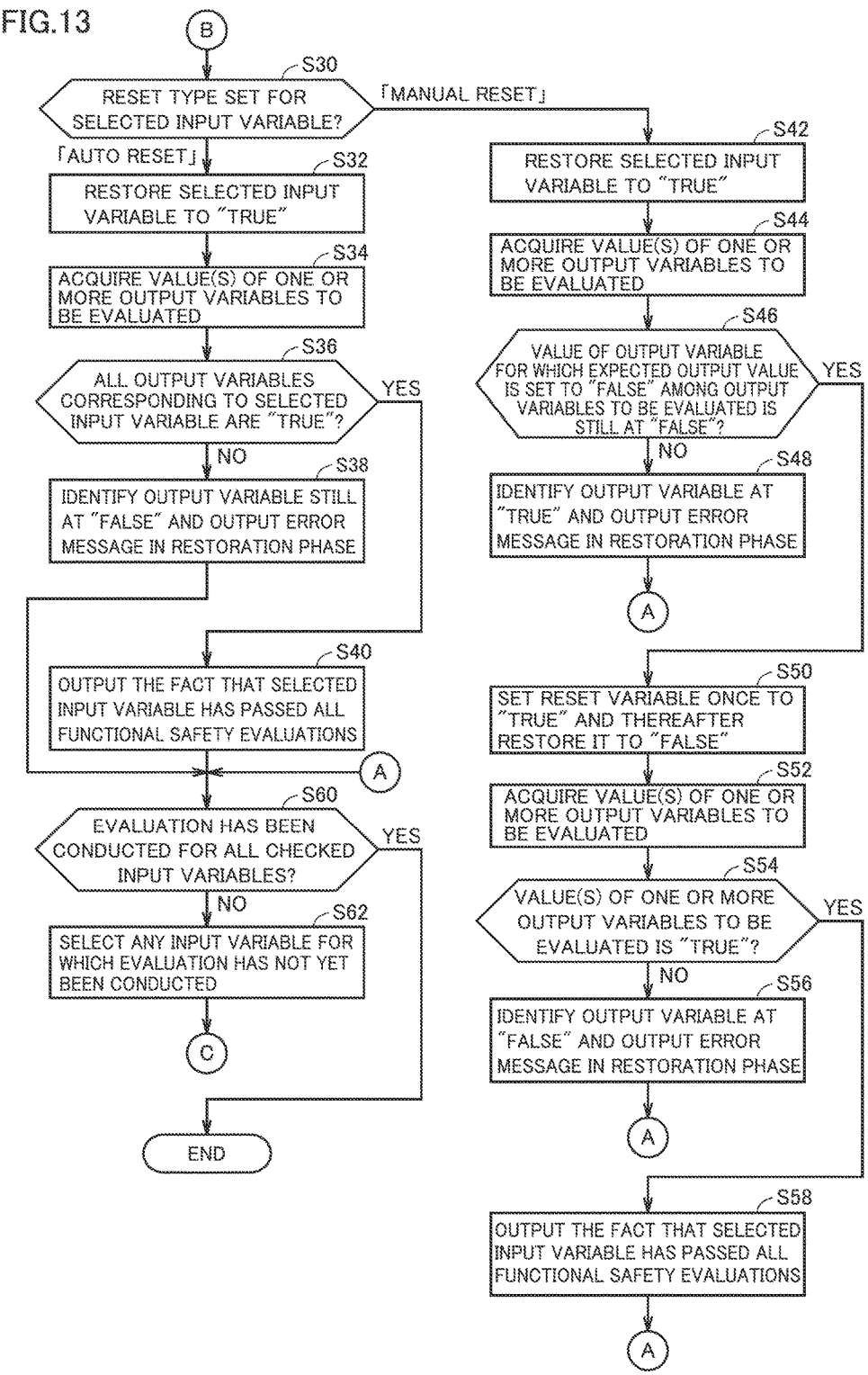
FIG. 13 is a flowchart showing the process procedure for the functional safety evaluation executed in the evaluation system in accordance with the present embodiment.

FIGS. 12 and 13 are each a flowchart showing a process procedure for a functional safety evaluation executed in evaluation system 1 in accordance with the present embodiment. Each step shown in FIGS. 12 and 13 is typically implemented through execution, by processor 102, of functional safety evaluation program 126 (both are in FIG. 2). It is supposed that the evaluation condition shown in FIG. 9 is set in advance.

Referring to FIGS. 12 and 13, initially a safety program to be evaluated is acquired and an execution module for the acquired safety program is generated (step S2). Then, an emulator (or external safety controller) starts execution of the execution module (step S4). Namely, based on one or more input signals, an operation in accordance with the safety program is performed to thereby repeatedly perform a process of determining the value(s) of corresponding one or more output signals. Then, an evaluation process is started.

First, the initialization phase of the evaluation process is executed. In the initialization phase, the value of the input signal to be evaluated is set to the initial value "TRUE" (first input value), and it is determined whether or not the output value of the output signal to be evaluated which is determined by the operation in accordance with the safety program is identical to its initial value "TRUE."

Specifically, all input variables which are input to the emulator are set to the initial value "TRUE" (step S10). In the case where the execution module for the safety program is executed by the emulator, the set value of the input variable is given to the emulator through an internal interface (typically API (Application Programming Interface)). In contrast, in the case where the execution module for the safety program is executed by an external safety controller, input variables and output variables are transmitted to/from the external safety controller through local communication interface 116 or the like.

Subsequently, reset signal is once set to "TRUE" and thereafter restored to "FALSE" (step S12). After this, it is determined whether or not the value(s) of one or more output variables to be evaluated is "TRUE" (step S14).

When the value of any output variable to be evaluated is "FALSE" (NO in step S14), the output variable with "FALSE" is identified and an error message in the initialization phase is output (step S16). In this case, the subsequent steps of the functional safety evaluation are cancelled. As the error message in the initialization phase, for example, "Output variable (XXX) is FALSE upon reset" or the like is used.

When the values of all output variables to be evaluated are "TRUE" (YES in step S14), the following steps of the interruption phase and the restoration phase are performed. For each input variable which is set in expected value setting area 330 (evaluation condition 20), the steps of the interruption phase and the restoration phase are repeated.

Specifically, initially from input variables which are set in expected value setting area 330, one of input variables for which their corresponding checkboxes are checked is selected (step S20). Then, the value of the input signal to be evaluated is changed from the initial value "TRUE" (first input value) to "FALSE" (second input value) and it is determined whether or not the first output value of the output signal to be evaluated, which is determined by the operation in accordance with the safety program, is identical to the expected output value.

Specifically, the selected input variable is set to "FALSE" (step S22) and the value(s) of one or more output variables to be evaluated is acquired (step S24). Namely, the selected input variable is interrupted. Subsequently, it is determined whether or not the expected output value of each of output variables to be evaluated, which corresponds to the selected input value, is identical to the acquired value of the output variable (step S26). Namely, for the output variable for which "FALSE" is set as its expected output value, it is determined whether or not the acquired value is "FALSE." For the output variable for which "TRUE" is set as its expected output value, it is determined whether or not the acquired value is "TRUE."

When the acquired value of any output variable is not identical to its expected output value (NO in step S26), the output variable which is not identical to the expected output value is identified and an error message in the interruption phase is output (step S28). In this case, the subsequent restoration phase is skipped and the process in step S60 is performed. As the error message in the interruption phase, for example, "Output variable (XXX) is not identical to expected output value" or the like is used.

In contrast, when the expected output value for each of all output variables to be evaluated is identical to the acquired value of the output variable (YES in step S26), the steps in the restoration phase are subsequently performed. Namely, the value of the input signal to be evaluated is restored from "FALSE" (second input value) to "TRUE" (first input value) and it is determined whether or not the second output value of the output signal to be evaluated, which is determined by the operation in accordance with the safety program, is identical to the first output value.

Specifically, it is determined whether the reset type which is set for the selected input variable is "auto reset" or "manual reset" (step S30).

When "auto reset" is set as the reset type ("auto reset" in step S30), the selected input variable is restored to "TRUE" (step S32) and the value(s) of one or more output variables to be evaluated is acquired (step S34). Namely, the selected input variable is restored thereto. Subsequently, it is determined whether or not the value of each of all output variables to be evaluated, which corresponds to the selected input variable, is "TRUE" (step S36). Namely, it is determined whether or not all output variables corresponding to the selected input variable have been restored to the initial value as the selected input value is restored to its initial value.

When the value of any output variable to be evaluated is still at "FALSE" (NO in step S36), the output variable which is still at "FALSE" is identified, an error message in the restoration phase is output (step S38), and the process in step S60 is performed. As the error message in the restoration phase, for example, "Output variable (XXX) has not been automatically restored" or the like is used.

In contrast, when all output variables to be evaluated have the value "TRUE" (YES in step S36), the fact that the selected input variable has passed all functional safety evaluations is output (step S40) and the process in step S60 is performed.

In contrast, when "manual reset" is set as the reset type ("manual reset" in step S30), the selected input variable is restored to "TRUE" (step S42) and the value(s) of one or more output variables to be evaluated is acquired (step S44). Namely, the selected input variable is restored thereto.

Subsequently, it is determined whether or not the value of an output variable to be evaluated for which its output value is set to "FALSE", among the output variables to be evaluated which correspond to the selected input variable, is still "FALSE" (step S46). Namely, it is determined that the value of the output variable subjected to "manual reset" has not been restored upon the restoration of the selected input variable.

When the value of any of output variables for which their expected output values are all set to "FALSE" is "TRUE" (NO in step S46), the output variable with "TRUE" is identified, an error message in the restoration phase is output (step S48), and the process in step S60 is performed. As the error message in the restoration phase, for example, "Output variable (XXX) has been automatically restored" or the like is used.

When the value of each of all output variables for which their expected output values are all set to "FALSE" is "FALSE" (YES in step S46), the reset signal is made valid and it is determined whether or not the third output value of the output signal to be evaluated, which is determined by the operation in accordance with the safety program, is identical to the first output value. Namely, after the reset variable is once set to "TRUE," the reset signal is restored to "FALSE" (step S50), and the value(s) of one or more output variables to be evaluated is acquired (step S52). Namely, the reset variable is activated. Subsequently, it is determined whether or not the value(s) of one or more output variables to be evaluated is "TRUE" (step S54).

When the value of any output variable to be evaluated is "FALSE" (NO in step S54), the output variable with "FALSE" is identified and an error message in the restoration phase is output (step S56). As the error message in the restoration phase, for example, "Output variable (XXX) is FALSE upon reset" or the like is used.

When the value of each of all output variables to be evaluated is "TRUE" (YES in step S54), the fact that the selected input variable has passed all functional safety evaluations is output (step S58), and the process in step S60 is performed.

In step S60, it is determined whether or not the evaluation of all input variables for which their corresponding checkboxes 332 are checked, among input variables set in expected value setting area 330, has been executed (step S60). When the evaluation of any input variable for which its corresponding checkbox is checked has not been executed (NO in step S60), the input variable for which the evaluation has not been executed is selected (step S62), and step S22 and subsequent steps are performed again.

When the evaluation of all input variables for which their corresponding checkboxes are checked has been executed (YES in step S60), the process of the functional safety evaluation is ended.

<I. Evaluation Result of Functional Safety Evaluation>

Next, an evaluation result of the functional safety evaluation shown in FIGS. 12 and 13 will be described.

Evaluation system 1 in accordance with the present embodiment has a function of outputting an evaluation result of the functional safety evaluation, in association with an input signal to be evaluated.

FIG. 14 is a schematic view showing an example of an evaluation result of a functional safety evaluation executed in evaluation system 1 in accordance with the present embodiment. Referring to FIG. 14, an evaluation result screen 350 includes a variable name display column 354 for displaying a variable name of an input variable to be evaluated, a comment display column 356 for displaying a comment on a corresponding input variable, a reset type display column 358 for displaying a reset type for a corresponding input variable, an expected value setting column 360 for displaying a combination of expected output values for a corresponding input variable, a result display column 372 for displaying an evaluation result, a result comment display column 374 for displaying a comment on a corresponding evaluation result, and a date display column 376 for displaying the date on which evaluation was executed.

In result display column 372, "Passed" is displayed for an input variable which has passed the above-described evaluation, and "Failed" is displayed for an input variable for which a certain error has occurred. Further, in the case where a certain error has occurred, expected value setting column 360 displays, in a different manner, the output variables in which the error has occurred. In result comment display column 374, an error message corresponding to this error is displayed. Namely, information indicating which phase has detected an error is included in a determination result. Moreover, a comment based on the phase determined as having the error is included in the determination result.

As shown in FIG. 14, generally evaluation condition 20 includes multiple sets of input signals to be evaluated, output signals to be evaluated, and expected output values. The evaluation process as described above is performed for each set. Information indicating which set includes an input signal determined as having an error is included in the determination result.

Moreover, as shown in FIG. 14, generally evaluation condition 20 includes a set of an input signal to be evaluated, a plurality of output signals to be evaluated, and a plurality of corresponding expected output values. The evaluation process as described above is performed for each of the plurality of expected output values. Information indicating which output signal has been determined as having an error is included in the determination result.

Such an expected output value is used as a reference and, when an error occurs in any output variable, details of the error associated with the expected output value are displayed. Accordingly, the functional safety evaluation of the safety program can more efficiently be performed.

<J. Evaluation Condition Setting Support>

Next, a description will be given of a configuration for supporting setting of an evaluation condition which is input in setting screen 300 as shown in FIG. 9. The process described below is provided by analysis and extraction function 6 shown in FIG. 1.

The evaluation condition in accordance with the present embodiment includes a setting(s) of one or more input signals (or input variables), one or more output signals (or output variables), and an expected output value(s). A user may arbitrarily set these pieces of information. However, as the number of steps of the safety program (program amount) increases, setting of all input signals and output signals to be evaluated is relatively burdensome. In view of this, evaluation system 1 in accordance with the present embodiment may implement a function of supporting setting of the evaluation condition.

Figure 15:
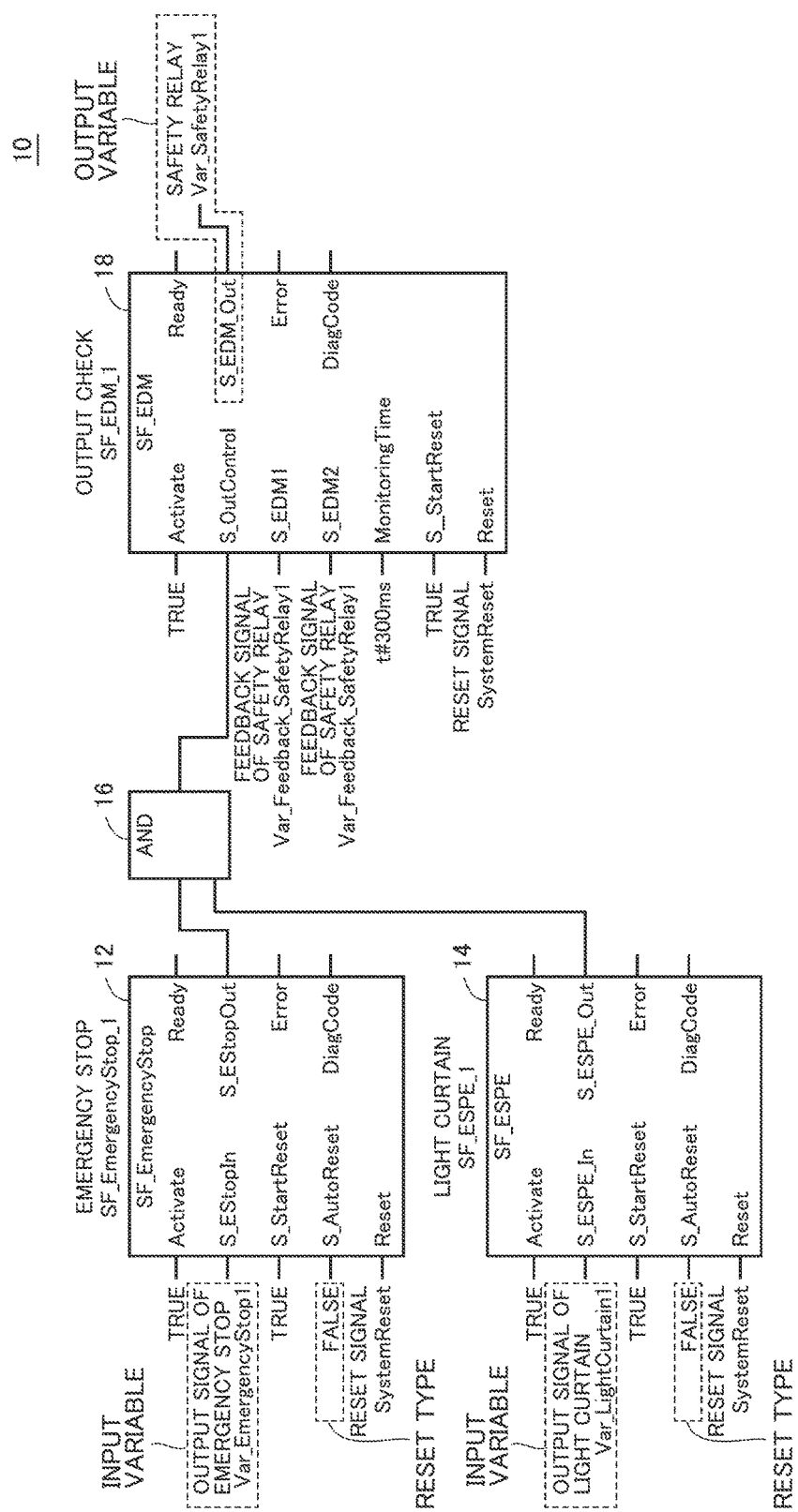
FIG. 15 is a schematic view illustrating a setting support function for an evaluation condition provided by the evaluation system in accordance with the present embodiment.
Figure 16:
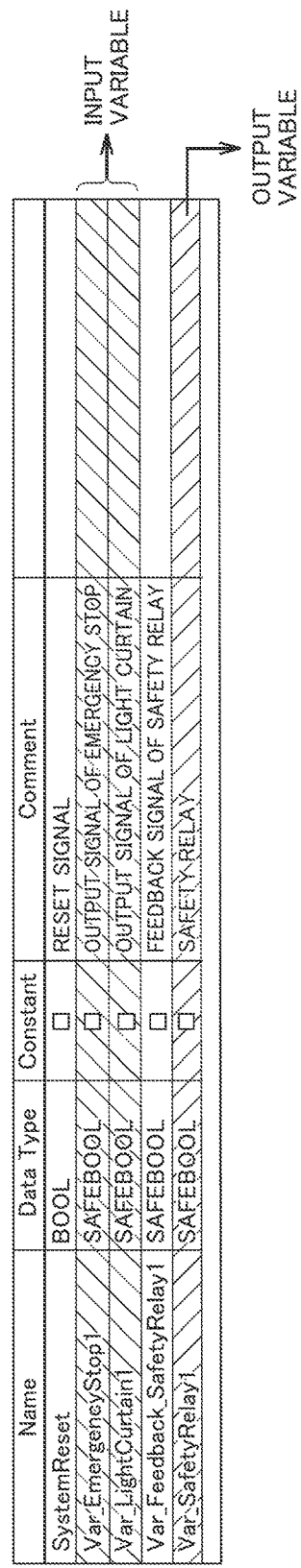
FIG. 16 is a schematic view illustrating a setting support function for an evaluation condition provided by the evaluation system in accordance with the present embodiment.

FIGS. 15 and 16 are each a schematic view illustrating a setting support function for an evaluation condition provided by evaluation system 1 in accordance with the present embodiment.

Referring to FIG. 15, a process of extracting an instruction directed to processing for causing a target device to operate with safety maintained, from instructions included in safety program 10, is performed. Subsequently, a process of extracting an input signal and an output signal related to the instruction extracted from safety program 10 is performed. In this way, an instruction for a safety operation included in safety program 10 can be extracted and variables and the like which are set for the extracted instruction can be extracted. Then, as shown in FIG. 9, a process is performed of displaying the extracted input signal and the extracted output signal in association with each other on setting screen 300, and receiving a setting of an expected output value for the displayed output signal, the expected output value being a value for causing the target device to operate with safety maintained. Finally, as shown in FIGS. 13 and 14, the value of the extracted input signal is changed, and it is determined whether or not the value of the output signal calculated by an operation in accordance with the safety program, in response to change of the value of the input signal, is identical to the expected output value. In this way, functional safety is evaluated.

Safety program 10 may be incorporated as a part of another program, or may include an instruction for a process other than the safety operation. In view of this, it is preferable to selectively extract an instruction (function block in the example shown in FIG. 15) for the safety operation included in safety program 10.

Particularly regarding a safety program which is produced in conformity with a certain regulation, the specifications or the like of function blocks used for the safety operation are standardized regardless of manufacturers. For example, an emergency stop FB and an output check FB are extracted from the safety program. Then, variables which are set as inputs or outputs of the extracted function blocks are extracted as variables to be used for the evaluation condition. Moreover, the reset type which is set for the instruction for which the input signal is extracted may also be extracted.

In the example shown in FIG. 15, variable "Var_EmergencyStop1" which is allocated to "S_EStopin" of emergency stop FB 12 is extracted and variable "Var_LightCurtain1" which is allocated to "S_ESPE_In" of emergency stop FB 14 is extracted, as input variables to be evaluated. In addition to these extracted input variables, the value of the reset type which is set for a target function block is extracted. In the example shown in FIG. 15, it is determined that the reset type is "manual reset," from "FALSE" which is a value that is set for "S_AutoReset" of emergency stop FB 12 and emergency stop FB 14.

Moreover, as an output variable to be evaluated, the variable "Var_Safety_Relay1" which is allocated to "S_EDM_Out" of output check FB 18 is extracted.

As seen from the above, in the case where the safety program is written using function blocks in conformity with the regulation published by PLCopen® for example, the emergency stop function block (emergency stop FBs 12, 14 in the example shown in FIG. 15) included in the safety program is extracted. Then, an input signal allocated to the emergency stop function block is extracted. Further, as an output signal to be evaluated, an output signal is extracted which is finally output through another function block (output check FB 18 in the example shown in FIG. 15) which is connected to the output of the extracted emergency stop function block.

As to the variables which are set as shown in FIG. 16, input variables and output variables to be subjected to the functional safety evaluation are extracted by the process as described above. Then, a combination of the extracted input variable and the extracted output variable is displayed in expected value setting area 330 (FIG. 9) or the like of setting screen 300.

Usually, a plurality of input signals are extracted. Therefore, as shown in setting screen 300 in FIG. 9, a plurality of these extracted input signals are displayed and a plurality of output signals associated with the extracted input signals are displayed in association with respective input signals.

FIG. 17 is a flowchart showing a process procedure for a setting support function for an evaluation condition provided by evaluation system 1 in accordance with the present embodiment. Each step shown in FIG. 17 is typically implemented through execution of functional safety evaluation program 126 by processor 102 (both are in FIG. 2).

Referring to FIG. 17, initially a safety program to be evaluated is acquired, and the acquired safety program is analyzed (parsed) (step S100). Subsequently, based on the result of the analysis of the safety program, an instruction (function block: emergency stop FB and output check FB for example) for a safety operation included in the safety program is extracted (step S102), and an input variable which is allocated to the extracted instruction is extracted (step S104). In addition to the extracted input variable, information about a reset type which is set for the target instruction is extracted (step S106). Further, an output variable which is allocated to the extracted instruction is extracted (step S108).

The information about the extracted input variable, the extracted reset type associated with the input variable, and the extracted output variable is reflected in expected value setting column 340 of setting screen 300 shown in FIG. 9 (step S110). Accordingly, the process is ended.

After the process for supporting setting of the evaluation condition as described above is performed, a setting of the evaluation condition provided from a user is received.

<K. Advantages>

In accordance with the present embodiment, a combination of an input signal and one or more output signals associated with the input signal which are included in the safety program is defined, and an expected value of each output signal value (expected output value) for each combination is set. Moreover, a reset type associated with each input signal is set. Accordingly, the value of the input signal (input value) is changed depending on the three phases (initialization phase, interruption phase, restoration phase), and it is determined whether or not the output value calculated in each phase is a value defined depending on the expected output value which is set in advance and the reset type. In this way, the overall functional safety of the safety program is automatically evaluated. Therefore, functional safety of the safety program can be evaluated more easily.

Moreover, in accordance with the present embodiment, when an error occurs in any phase, the phase in which the error has occurred and an output signal for which the error has occurred are identified, and they are output as the results of evaluation of functional safety. Therefore, even when a certain malfunction occurs in functional safety of the safety program, the cause of the malfunction and a method for solution to the malfunction can be identified easily.

Moreover, in accordance with the present embodiment, an input signal, an output signal, and a reset type which are included in the safety program are automatically extracted. Therefore, a user can only set an expected output value to easily evaluate functional safety.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An evaluation system for evaluating functional safety of a safety program for causing a target device to operate with safety maintained, when a predetermined condition is satisfied, the evaluation system comprising:
   at least one processor or circuit programmed to execute instructions to perform the following:
   determine, based on one or more input signals, a value or values of corresponding one or more output signals by performing an operation in accordance with the safety program;
   receive an evaluation condition including:
   an input signal to be evaluated;
   an output signal to be evaluated; and
   an expected output value which is a value of the output signal to be evaluated and which is to be output in response to change of a value of the input signal to be evaluated;
   change the value of the input signal to be evaluated, from a first input value which is an initial value to a second input value, and make a first determination of whether a first output value of the output signal to be evaluated is identical to the expected output value;
   restore the value of the input signal to be evaluated, from the second input value to the first input value, and make a second determination of whether a second output value of the output signal to be evaluated is identical to the first output value; and
   output, in association with the input signal to be evaluated, said first determination and said second determination.

2. The evaluation system according to claim 1, wherein receiving the evaluation condition includes a setting of one of:
   a first type defining that, when the value of the input signal is restored from the second input value to the first input value, an output value of a corresponding output signal should be restored to an original value following the value of the input signal being restored from the second input value to the first input value; and
   a second type defining that the output value of the corresponding output signal should not be restored to the original value until a predetermined reset condition is satisfied, and
   in a case where the first type is set, the processor or circuit determines that an operation under the first type is correct when the second output value of the output signal to be evaluated is different from the first output value, and
   in a case where the second type is set, the processor or circuit determines that an operation under the second type is correct when the second output value of the output signal to be evaluated is identical to the first output value.

3. The evaluation system according to claim 2, wherein receiving the evaluation condition includes a setting of a reset signal as the predetermined reset condition for the second type, and
   the processor or circuit is configured to make the reset signal valid after the second determination, and make a third determination as to whether a third output value of the output signal to be evaluated is identical to the first output value.

4. The evaluation system according to claim 1, wherein the processor or circuit is programmed to execute instructions to set the value of the input signal to be evaluated to the first input value before the first determination, and determine whether a fourth output value of the output signal to be evaluated is identical to an initial value of the output signal.

5. The evaluation system according to claim 1, wherein as the first input value which is the initial value, a value is used different from a value indicated in a memory state similar to a state during failure of power supplied to a safety controller executing the safety program.

6. The evaluation system according to claim 1, wherein the output incorporates, in the determination result, information indicating whether the first or the second determination detects an error.

7. The evaluation system according to claim 1, wherein the evaluation condition includes multiple sets each constituted of the input signal to be evaluated, the output signal to be evaluated, and the expected output value, and one or more of the first and second determinations is performed for each set of the multiple sets, and
   the output incorporates, in the determination result, information indicating which set includes an input signal determined as having an error.

8. The evaluation system according to claim 1, wherein the evaluation condition includes a set of the input signal to be evaluated, a plurality of the output signals to be evaluated, and a plurality of the expected output values corresponding to the output signals, and one or more of the first and second determinations is performed for each of the plurality of the expected output values, and
   the output incorporates, in the determination result, information indicating which output signal is determined as having an error.

9. The evaluation system according to claim 1, wherein the output incorporates, in the determination result, a comment depending on whether the first or second determination detects an error.

10. A non-transitory storage medium storing thereon an evaluation program for evaluating functional safety of a safety program for causing a target device to operate with safety maintained, when a predetermined condition is satisfied, the evaluation program, when executed by a processor, causing the processor to perform:
    determining, based on one or more input signals, a value or values of corresponding one or more output signals by performing an operation in accordance with the safety program;
    receiving an evaluation condition including:
    an input signal to be evaluated;
    an output signal to be evaluated; and
    an expected output value which is a value of the output signal to be evaluated and which is to be output in response to change of a value of the input signal to be evaluated;
    changing the value of the input signal to be evaluated, from a first input value which is an initial value to a second input value, and determining whether a first output value of the output signal to be evaluated which is determined by an operation in accordance with the safety program is identical to the expected output value;
    restoring the value of the input signal to be evaluated, from the second input value to the first input value, and determining whether a second output value of the output signal to be evaluated which is determined by an operation in accordance with the safety program is identical to the first output value; and outputting, in association with the input signal to be evaluated, a determination result of the steps of determining.

11. An evaluation method for evaluating functional safety of a safety program for causing a target device to operate with safety maintained, when a predetermined condition is satisfied, the evaluation method comprising:
determining, based on one or more input signals, a value or values of corresponding one or more output signals by performing an operation in accordance with the safety program;
receiving an evaluation condition including:
an input signal to be evaluated;
an output signal to be evaluated; and
an expected output value which is a value of the output signal to be evaluated and which is to be output in response to change of a value of the input signal to be evaluated;
changing the value of the input signal to be evaluated, from a first input value which is an initial value to a second input value, and determining whether a first output value of the output signal to be evaluated which is determined by an operation in accordance with the safety program is identical to the expected output value;
restoring the value of the input signal to be evaluated, from the second input value to the first input value, and determining whether a second output value of the output signal to be evaluated which is determined by an operation in accordance with the safety program is identical to the first output value; and
outputting, in association with the input signal to be evaluated, a determination result of the steps of determining.

12. The evaluation method according to claim 11, wherein the evaluation condition includes a setting of one of:
a first type defining that, when the value of the input signal is restored from the second input value to the first input value, an output value of a corresponding output signal should be restored to an original value following the value of the input signal being restored from the second input value to the first input value; and
a second type defining that the output value of the corresponding output signal should not be restored to the original value until a predetermined reset condition is satisfied, and
the evaluation method further comprises
in a case where the first type is set, determining that an operation under the first type is correct when the second output value of the output signal to be evaluated is different from the first output value, and
in a case where the second type is set, determining that an operation under the second type is correct when the second output value of the output signal to be evaluated is identical to the first output value.

13. The evaluation method according to claim 12, wherein the evaluation condition includes a setting of a reset signal as the predetermined reset condition for the second type, and
the evaluation method further comprises making the reset signal valid after determination by the step of restoring and determining, and determining whether a third output value of the output signal to be evaluated which is determined in accordance with the safety program is identical to the first output value.

14. The evaluation method according to claim 11, further comprising setting the value of the input signal to be evaluated to the first input value before the step of changing and determining, and determining whether a fourth output value of the output signal to be evaluated which is determined in accordance with the safety program is identical to an initial value of the output signal.

15. The evaluation method according to claim 11, wherein as the first input value which is the initial value, a value is used different from a value indicated in a memory state similar to a state during failure of power supplied to a safety controller executing the safety program.

16. The evaluation method according to claim 11, wherein the step of outputting comprises incorporating, in the determination result, information indicating one or more of the steps of determining in which an error is detected.

17. The evaluation method according to claim 11, wherein the evaluation condition includes multiple sets each constituted of the input signal to be evaluated, the output signal to be evaluated, and the expected output value, and determination by one or more of the steps of determining is performed for each set of the multiple sets, and
the step of outputting comprises incorporating, in the determination result, information indicating which set includes an input signal determined as having an error.

18. The evaluation method according to claim 11, wherein the evaluation condition includes a set of the input signal to be evaluated, a plurality of the output signals to be evaluated, and a plurality of the expected output values corresponding to the output signals, and determination by one or more of the steps of determining is performed for each of the plurality of the expected output values, and
the step of outputting comprises incorporating, in the determination result, information indicating which output signal is determined as having an error.

19. The evaluation method according to claim 11, wherein the step of outputting comprises incorporating, in the determination result, a comment depending on the step of determining in which an error is detected.

20. An evaluation system for evaluating functional safety of a safety program for causing a target device to operate with safety maintained, when a predetermined condition is satisfied, the evaluation system comprising:
a process execution module configured to determine, based on one or more input signals, a value or values of corresponding one or more output signals by performing an operation in accordance with the safety program;
a setting module configured to receive an evaluation condition including:
an input signal to be evaluated;
an output signal to be evaluated; and
an expected output value which is a value of the output signal to be evaluated and which is to be output in response to change of a value of the input signal to be evaluated;
a first determination module configured to change the value of the input signal to be evaluated, from a first input value which is an initial value to a second input value, and determine whether a first output value of the output signal to be evaluated which is determined by the process execution module is identical to the expected output value;
a second determination module configured to restore the value of the input signal to be evaluated, from the second input value to the first input value, and determine whether a second output value of the output signal to be evaluated which is determined by the process execution module is identical to the first output value; and an output module configured to output, in association with the input signal to be evaluated, a determination result provided by the first determination module and the second determination module.

* * * * *